US009595360B2

(12) United States Patent
Dhar et al.

(10) Patent No.: US 9,595,360 B2
(45) Date of Patent: Mar. 14, 2017

(54) METALLIC ALLOYS HAVING AMORPHOUS, NANO-CRYSTALLINE, OR MICROCRYSTALLINE STRUCTURE

(71) Applicants: Subhash K. Dhar, Bloomfield Hills, MI (US); Fabio Albano, Royal Oak, MI (US); Erik W. Anderson, Royal Oak, MI (US); Srinivasan Venkatesan, Bloomfield Hills, MI (US)

(72) Inventors: Subhash K. Dhar, Bloomfield Hills, MI (US); Fabio Albano, Royal Oak, MI (US); Erik W. Anderson, Royal Oak, MI (US); Srinivasan Venkatesan, Bloomfield Hills, MI (US)

(73) Assignee: ENERGY POWER SYSTEMS LLC, Pontiac, MI (US)

( * ) Notice: Subject to any disclaimer, the term of this patent is extended or adjusted under 35 U.S.C. 154(b) by 64 days.

(21) Appl. No.: 13/843,953

(22) Filed: Mar. 15, 2013

(65) Prior Publication Data
US 2013/0216857 A1  Aug. 22, 2013

Related U.S. Application Data

(63) Continuation-in-part of application No. 13/350,505, filed on Jan. 13, 2012.

(51) Int. Cl.
*H01B 1/02* (2006.01)
*C22C 11/00* (2006.01)
(Continued)

(52) U.S. Cl.
CPC ............ *H01B 1/02* (2013.01); *B21C 23/22* (2013.01); *B32B 15/043* (2013.01); *C22C 1/002* (2013.01);
(Continued)

(58) Field of Classification Search
CPC ....... B21C 23/22; B32B 15/043; C22C 11/00; C22C 11/02; C22C 11/06; C22C 1/002;
(Continued)

(56) References Cited

U.S. PATENT DOCUMENTS

| 275,859 A | 4/1883 | Robertson |
| 2,883,443 A | 4/1959 | Ruetschi et al. |

(Continued)

FOREIGN PATENT DOCUMENTS

| CN | 2508406 Y | 8/2002 |
| CN | 1553531 A | 12/2004 |

(Continued)

OTHER PUBLICATIONS

Karami, Hassan, Synthesis of Lead Dioxide Nanoparticles by the Pulsed Current Electrochemical Method, Int. J. Electrochem. Sci., Jun. 22, 2009, vol. 4, pp. 1511-1527.*

(Continued)

*Primary Examiner* — Jonathan Jelsma
*Assistant Examiner* — Rashid Alam
(74) *Attorney, Agent, or Firm* — Finnegan, Henderson, Farabow, Garrett & Dunner, LLP

(57) ABSTRACT

A metal alloy for use in a wire included in an electrochemical cell is disclosed having an amorphous structure, microcrystalline grains, or grains that are sized less than about one micron. In various embodiments, the microcrystalline grains are not generally longitudinally oriented, are variably oriented, or are randomly oriented. In some embodiments, the microcrystalline grains lack uniform grain size or are variably sized. In some embodiments, the microcrystalline grains have an average grain size of less than or equal to 5 microns. In some embodiments, the metal alloy lacks long-range crystalline order among the microcrystalline grains. In some embodiments, the wire is used in a substrate used in (Continued)

the electrochemical cell. In some embodiments, the metal alloy is formed using a co-extrusion process comprising warming up the metallic alloy and applying pressure and simultaneously passing a core material through a die to obtain a composite structure.

13 Claims, 17 Drawing Sheets

(51) Int. Cl.
*C22C 11/06* (2006.01)
*C22C 45/00* (2006.01)
*C22C 1/00* (2006.01)
*B21C 23/22* (2006.01)
*B32B 15/04* (2006.01)
*H01M 4/73* (2006.01)
*H01M 4/68* (2006.01)
*C23C 28/00* (2006.01)
*C23C 28/04* (2006.01)
*C22C 11/02* (2006.01)

(52) U.S. Cl.
CPC .............. *C22C 11/00* (2013.01); *C22C 11/02* (2013.01); *C22C 11/06* (2013.01); *C22C 45/00* (2013.01); *C23C 28/04* (2013.01); *C23C 28/042* (2013.01); *C23C 28/322* (2013.01); *C23C 28/34* (2013.01); *C23C 28/345* (2013.01); *C23C 28/3455* (2013.01); *H01M 4/685* (2013.01); *H01M 4/73* (2013.01); *Y10T 428/12493* (2015.01)

(58) Field of Classification Search
CPC ......... C22C 45/00; H01M 4/685; H01M 4/73; C23C 28/04; C23C 28/042; C23C 28/322; C23C 28/34; C23C 28/345; C23C 28/3455
USPC ................................ 429/482, 483, 122–255
See application file for complete search history.

(56) References Cited

U.S. PATENT DOCUMENTS

| | | | |
|---|---|---|---|
| 3,395,043 A | 7/1968 | Shoeld | |
| 3,615,831 A * | 10/1971 | Ruben | 429/204 |
| 3,808,040 A | 4/1974 | Barnes et al. | |
| 3,819,412 A | 6/1974 | Taylor et al. | |
| 3,880,728 A | 4/1975 | Habermann et al. | |
| 3,929,505 A | 12/1975 | Burkett et al. | |
| 3,941,615 A | 3/1976 | McDowall | |
| 4,020,244 A | 4/1977 | Selinko | |
| 4,051,000 A | 9/1977 | Gendron et al. | |
| 4,076,901 A | 2/1978 | Fritz et al. | |
| 4,096,318 A | 6/1978 | Wurmb et al. | |
| 4,115,630 A | 9/1978 | Van Ommering et al. | |
| 4,209,575 A | 6/1980 | McDowall et al. | |
| 4,239,839 A | 12/1980 | McDowall et al. | |
| 4,271,244 A | 6/1981 | Gabano et al. | |
| 4,289,835 A | 9/1981 | Lee et al. | |
| 4,307,758 A | 12/1981 | McDowall et al. | |
| 4,323,470 A | 4/1982 | Mahato et al. | |
| 4,345,009 A | 8/1982 | Fahle et al. | |
| 4,353,969 A | 10/1982 | Rippel et al. | |
| 4,401,730 A | 8/1983 | Szymborski et al. | |
| 4,405,697 A | 9/1983 | Rowlette | |
| 4,415,411 A | 11/1983 | Kanai et al. | |
| 4,430,390 A | 2/1984 | Fekete | |
| 4,477,540 A | 10/1984 | Miller et al. | |
| 4,517,264 A | 5/1985 | Miller et al. | |
| 4,525,327 A | 6/1985 | Bardin et al. | |
| 4,537,842 A | 8/1985 | Sundberg | |
| 4,547,939 A | 10/1985 | McDowall et al. | |
| 4,563,727 A | 1/1986 | Curiel | |
| 4,603,093 A | 7/1986 | Edwards et al. | |
| 4,615,107 A | 10/1986 | Kumeta et al. | |
| 4,642,274 A | 2/1987 | Tsutsumi et al. | |
| 4,658,623 A | 4/1987 | Blanyer et al. | |
| 4,664,992 A | 5/1987 | Edwards et al. | |
| 4,692,391 A | 9/1987 | Hirota | |
| 4,787,125 A | 11/1988 | Pinsky et al. | |
| 4,861,689 A | 8/1989 | Clough et al. | |
| 4,865,933 A * | 9/1989 | Blanyer | B21C 23/24 29/2 |
| 4,874,681 A | 10/1989 | Rippei | |
| 4,957,830 A | 9/1990 | Jones | |
| 4,964,878 A | 10/1990 | Morris | |
| 4,978,601 A | 12/1990 | Kim et al. | |
| 4,997,728 A | 3/1991 | Onoda et al. | |
| 5,009,968 A | 4/1991 | Guthrie et al. | |
| 5,010,637 A | 4/1991 | Blanyer et al. | |
| 5,114,804 A | 5/1992 | Stiles et al. | |
| 5,120,620 A | 6/1992 | Nelson et al. | |
| 5,126,218 A | 6/1992 | Clarke | |
| 5,156,935 A | 10/1992 | Hohjo et al. | |
| 5,158,841 A | 10/1992 | Mennicke et al. | |
| 5,203,972 A | 4/1993 | Shimamune et al. | |
| 5,288,566 A | 2/1994 | Ginatta et al. | |
| 5,321,627 A | 6/1994 | Reher | |
| 5,331,268 A | 7/1994 | Patino et al. | |
| 5,348,817 A | 9/1994 | Rao et al. | |
| 5,349,282 A | 9/1994 | McClure | |
| 5,357,203 A | 10/1994 | Landau et al. | |
| 5,365,160 A | 11/1994 | Leppo et al. | |
| 5,368,960 A | 11/1994 | Rowlette | |
| 5,379,502 A | 1/1995 | Feldstein | |
| 5,396,163 A | 3/1995 | Nor et al. | |
| 5,397,659 A | 3/1995 | Imhof et al. | |
| 5,409,787 A | 4/1995 | Blanyer et al. | |
| 5,427,872 A | 6/1995 | Shen et al. | |
| 5,449,571 A | 9/1995 | Longardner et al. | |
| 5,474,863 A | 12/1995 | Yamamoto | |
| 5,563,496 A | 10/1996 | McClure | |
| 5,585,209 A | 12/1996 | Feldstein | |
| 5,698,967 A | 12/1997 | Baer et al. | |
| 5,701,068 A | 12/1997 | Baer et al. | |
| 5,710,506 A | 1/1998 | Broell et al. | |
| 5,738,955 A | 4/1998 | Gardner et al. | |
| 5,744,258 A | 4/1998 | Bai et al. | |
| 5,798,189 A | 8/1998 | Hayashida et al. | |
| 5,830,603 A | 11/1998 | Oka et al. | |
| 5,851,695 A | 12/1998 | Misra et al. | |
| 5,851,698 A | 12/1998 | Reichman et al. | |
| 5,853,914 A | 12/1998 | Kawakami | |
| 5,856,047 A | 1/1999 | Venkatesan et al. | |
| 5,925,470 A | 7/1999 | Blanyer et al. | |
| 5,958,625 A | 9/1999 | Rao | |
| 6,027,822 A | 2/2000 | Blanyer et al. | |
| 6,074,774 A | 6/2000 | Semmens et al. | |
| 6,124,057 A | 9/2000 | Ito et al. | |
| 6,139,705 A | 10/2000 | Brown, Jr. et al. | |
| 6,153,156 A | 11/2000 | Lawrence et al. | |
| 6,204,630 B1 | 3/2001 | James | |
| 6,232,017 B1 | 5/2001 | Tsuchida et al. | |
| 6,248,478 B1 | 6/2001 | Friend et al. | |
| 6,316,148 B1 | 11/2001 | Timmons et al. | |
| 6,330,925 B1 | 12/2001 | Ovshinsky et al. | |
| 6,352,795 B1 | 3/2002 | Nilsson et al. | |
| 6,440,384 B1 | 8/2002 | Leung et al. | |
| 6,511,773 B1 | 1/2003 | Dampier | |
| 6,557,655 B2 | 5/2003 | Ovshinsky et al. | |
| 6,565,836 B2 | 5/2003 | Ovshinsky et al. | |
| 6,566,010 B1 | 5/2003 | Bhardwaj et al. | |
| 6,759,034 B2 | 7/2004 | Ovshinsky et al. | |
| 6,770,226 B2 | 8/2004 | Hampden-Smith et al. | |
| 6,820,706 B2 | 11/2004 | Ovshinsky et al. | |
| 6,837,321 B2 | 1/2005 | Ovshinsky et al. | |
| 6,858,348 B2 | 2/2005 | Kitoh | |
| 6,889,410 B2 | 5/2005 | Shivashankar et al. | |
| 6,908,711 B2 | 6/2005 | Fauteux et al. | |
| 7,035,078 B1 | 4/2006 | Viavattine | |
| 7,060,391 B2 | 6/2006 | Gyenge et al. | |

(56) References Cited

U.S. PATENT DOCUMENTS

| | | |
|---|---|---|
| 7,118,830 B1 | 10/2006 | Boden et al. |
| 7,119,047 B1 | 10/2006 | Adrianov et al. |
| 7,217,473 B2 | 5/2007 | Ovshinsky et al. |
| 7,226,675 B2 | 6/2007 | Ovshinsky et al. |
| 7,273,674 B1 | 9/2007 | Frustaci et al. |
| 7,399,554 B2 | 7/2008 | Kejha |
| 7,476,463 B2 | 1/2009 | DeSilvestro et al. |
| 7,482,081 B2 | 1/2009 | Hong |
| 7,541,113 B2 | 6/2009 | Partington |
| 7,732,098 B2 | 6/2010 | Gerber |
| 7,790,304 B2 | 9/2010 | Hendricks et al. |
| 7,799,466 B2 | 9/2010 | Lin |
| 7,811,701 B2 | 10/2010 | Yao |
| 7,816,034 B2 | 10/2010 | McGervey et al. |
| 7,826,197 B2 | 11/2010 | Gramm et al. |
| 7,868,777 B2 | 1/2011 | Bruce et al. |
| 7,881,042 B2 | 2/2011 | Buiel et al. |
| 8,017,273 B2 | 9/2011 | Lara-Curzio et al. |
| 8,048,572 B2 | 11/2011 | Gerber |
| 8,472,164 B2 | 6/2013 | Kim |
| 2002/0031702 A1 | 3/2002 | Kimura et al. |
| 2002/0074972 A1 | 6/2002 | Narang et al. |
| 2002/0088515 A1 | 7/2002 | Aust et al. |
| 2002/0100725 A1 | 8/2002 | Lee et al. |
| 2002/0122975 A1 | 9/2002 | Spillman et al. |
| 2003/0049528 A1 | 3/2003 | Honobo et al. |
| 2003/0170535 A1 | 9/2003 | Watanabe |
| 2003/0207156 A1 | 11/2003 | Ovshinsky et al. |
| 2004/0112486 A1 | 6/2004 | Aust et al. |
| 2004/0170889 A1 | 9/2004 | Feng et al. |
| 2005/0208382 A1* | 9/2005 | Datta et al. ............. 429/238 |
| 2005/0221191 A1 | 10/2005 | Kondo et al. |
| 2006/0046148 A1 | 3/2006 | Sakai et al. |
| 2006/0093912 A1 | 5/2006 | Mayer |
| 2007/0009790 A1 | 1/2007 | Vutetakis et al. |
| 2007/0111080 A1 | 5/2007 | Brost et al. |
| 2007/0128472 A1 | 6/2007 | Tierney et al. |
| 2007/0148542 A1 | 6/2007 | Szymborski et al. |
| 2008/0038629 A1 | 2/2008 | Okabe et al. |
| 2008/0111508 A1 | 5/2008 | Dasgupta et al. |
| 2008/0241687 A1 | 10/2008 | Ishii et al. |
| 2008/0245587 A1 | 10/2008 | Sastry et al. |
| 2009/0053594 A1 | 2/2009 | Johnson et al. |
| 2009/0181306 A1 | 7/2009 | Kurisawa |
| 2009/0269658 A1 | 10/2009 | Shukla et al. |
| 2009/0269666 A1 | 10/2009 | Lara-Curzio et al. |
| 2009/0311123 A1* | 12/2009 | Zhang et al. ............. 419/19 |
| 2010/0015531 A1 | 1/2010 | Dickinson et al. |
| 2010/0136245 A1 | 6/2010 | Albano et al. |
| 2010/0138072 A1 | 6/2010 | Wang et al. |
| 2010/0141212 A1 | 6/2010 | Stancovski |
| 2010/0167117 A1 | 7/2010 | Maroon et al. |
| 2010/0178543 A1 | 7/2010 | Gruner et al. |
| 2010/0183920 A1 | 7/2010 | Shaffer, II et al. |
| 2010/0190047 A1 | 7/2010 | West et al. |
| 2010/0221595 A1 | 9/2010 | Murata et al. |
| 2011/0020693 A1 | 1/2011 | Hoshiba |
| 2011/0104563 A1 | 5/2011 | Galloway et al. |
| 2011/0151286 A1 | 6/2011 | Lam et al. |
| 2011/0159369 A1* | 6/2011 | Chen ............. 429/226 |
| 2011/0171527 A1 | 7/2011 | Simpson |
| 2011/0247936 A1 | 10/2011 | Stancovski |
| 2011/0274950 A1 | 11/2011 | Whitacre |
| 2011/0274969 A1 | 11/2011 | Wang |
| 2011/0287314 A1 | 11/2011 | Jung |
| 2011/0305927 A1* | 12/2011 | Lev et al. ............. 429/53 |
| 2012/0003509 A1 | 1/2012 | Gerber |
| 2012/0003543 A1 | 1/2012 | Kirchev et al. |
| 2012/0009479 A1 | 1/2012 | Kobori et al. |
| 2012/0040255 A1 | 2/2012 | Hermann |
| 2012/0208068 A1 | 8/2012 | Fukunaga et al. |
| 2012/0251876 A1 | 10/2012 | Jagannathan |
| 2012/0321949 A1* | 12/2012 | Kawakami et al. ............. 429/211 |
| 2013/0183559 A1 | 7/2013 | Dhar et al. |
| 2013/0183572 A1 | 7/2013 | Dhar et al. |
| 2013/0183581 A1 | 7/2013 | Dhar et al. |
| 2013/0216857 A1 | 8/2013 | Dhar et al. |
| 2013/0244061 A1 | 9/2013 | Dhar et al. |
| 2013/0244063 A1 | 9/2013 | Dhar et al. |
| 2013/0344383 A1* | 12/2013 | Loveness et al. ............. 429/211 |
| 2014/0023917 A1 | 1/2014 | Loganthan et al. |
| 2014/0186712 A1 | 7/2014 | Aibano et al. |
| 2014/0329148 A1 | 11/2014 | Izumi et al. |

FOREIGN PATENT DOCUMENTS

| | | |
|---|---|---|
| CN | 101719565 A | 6/2010 |
| CN | 102208691 A | 10/2011 |
| DE | 3228151 C1 | 2/1984 |
| EP | 0 107 517 A2 | 5/1984 |
| EP | 0 563 773 A1 | 10/1993 |
| GB | 2 289 976 A | 12/1995 |
| GB | 2 381 179 A | 4/2003 |
| JP | 55-133761 A | 10/1980 |
| JP | 56-145672 A | 11/1981 |
| JP | 58-166679 A | 10/1983 |
| JP | 60-091572 | 5/1985 |
| JP | 5-129014 | 5/1993 |
| JP | 09115524 A | 5/1997 |
| JP | 2005056622 A | 3/2005 |
| WO | WO 95/15584 A1 | 6/1995 |
| WO | WO 99/01902 | 1/1999 |
| WO | WO 99/26802 A1 | 6/1999 |
| WO | WO 02/069421 | 9/2002 |
| WO | WO 2005/091404 A1 | 9/2005 |
| WO | WO 2008/109429 A2 | 9/2008 |
| WO | WO 2010/051848 A1 | 5/2010 |
| WO | WO 2011/133677 | 10/2011 |

OTHER PUBLICATIONS http://www.britannica.com/EBchecked/topic/347353/long-range-order, Encyclopedia Brittanica Inc., 2014.*

Fang, W. Effect of Gap Size on Coating Extrusion of Pb-GF Composite Wire by Theoretical Calculation and Experimental Investigation Sci. Technol., J. Mater. Sci. Technol., vol. 21 No. 5, 2005.*

Christoglou et al., "Deposition of Cr, Al coatings on Ni by Means of a PB and FB CVD process" J. Phys. IV France, 11:1125-1130 (2001).

Diniz et al., "A comparative study of pulsed current formation for positive plates of automotive lead acid batteries" J. Power Sources, 109:184-188 (2002).

Ellis et al., "The performance of Ebonex® electrodes in bipolar lead-acid batteries" J. Power Sources, 136:366-371 (2004).

Fang et al., "Effect of Gap Size on Coating Extrusion of Pb-GF Composite Wire by Theoretical Calculation and Experimental Investigation" J. Mater. Sci. Technol., 21:729-732 (2005).

Jay "The Horizon® Valve-Regulated Lead Acid Battery—Reengineering the Lead Acid Battery" Proceedings of the 31st Intersociety Energy Conversion Engineering Conference, Aug. 11-16, 1996, Washington, DC. vol. 2, 96227, pp. 1148-1152.

Karami et al., "Synthesis of Lead Dioxide Nanoparticles by the Pulsed Current Electrochemical Method" Int. J. Electrochem. Sci., 4:1511-1527 (2009).

Keyser et al., "Charging Algorithms for Increasing Lead Acid Battery Cycle Life for Electric Vehicles" Presented at the 17th Electric Vehicle Symposium, Montreal, Canada, Oct. 16-18, 2000 (28 pages).

Kurisawa et al., "Development of positive electrodes with an $SnO_2$ coating by applying a sputtering technique for lead-acid batteries" J. Power Sources, 95:125-129 (2001).

Lam et al., "Pulsed-current charging of lead/acid batteries—a possible means for overcoming premature capacity loss?" J. Power Sources, 53:215-228 (1995).

Lam et al., "Novel technique to ensure battery reliability in 42-V PowerNets for new-generation automobiles" J. Power Sources, 144:552-559 (2005).

(56) References Cited

OTHER PUBLICATIONS

Loyns et al., "Bipolar batteries based on Ebonex® technology" *J. Power Sources*, 144:329-337 (2005).
Pulsetech Products Corp., "The U.S. Army Battery Maintenance Program" Training Slides [online]. Retrieved from the Internet: http://www.pulsetech.net/Assets/Misc/PPC%20BMMP%20-%20Jan%202012_sm.pdf, 56 pages (date unknown).
Ravichandran et al., "Analysis of shear banding in metallic glasses under bending" *Acta Materialia*, 53:4087-4095 (2005).
Torabi et al., "Study of Thermal-Runaway in Batteries. II. The Main Sources of Heat Generation in Lead-Acid Batteries" *J. Electrochem. Soc.*, 160(2):A223-A234 (2013).
Yolshina et al., "A lead-film electrode on an aluminium substrate to serve as a lead-acid battery plate" *J. Power Sources*, 78:84-87 (1999).
Co-pending U.S. Appl. No. 13/350,505, filed Jan. 13, 2012.
Co-pending U.S. Appl. No. 13/350,686, filed Jan. 13, 2012.
Co-pending U.S. Appl. No. 13/419,678, filed Mar. 27, 2012.
Co-pending U.S. Appl. No. 13/475,484, filed May 18, 2012.
Co-pending U.S. Appl. No. 13/588,623, filed Aug. 17, 2012.
Co-pending U.S. Appl. No. 13/626,426, filed Sep. 25, 2012.
Co-pending U.S. Appl. No. 13/766,991, filed Feb. 14, 2013.
Co-pending U.S. Appl. No. 13/768,192, filed Feb. 15, 2013.
Co-pending U.S. Appl. No. 13/770,230, filed Feb. 19, 2013.
Co-pending U.S. Appl. No. 13/842,777, filed Mar. 15, 2013.
Co-pending U.S. Appl. No. 13/843,373, filed Mar. 15, 2013.
Co-pending U.S. Appl. No. 14/145,640, filed Dec. 31, 2013.
Co-pending U.S. Appl. No. 14/145,692, filed Dec. 31, 2013.
Co-pending U.S. Appl. No. 14/145,899, filed Dec. 31, 2013.
Office Action (Final) mailed Dec. 18, 2013, in co-pending U.S. Appl. No. 13/419,678.
Office Action (Final) mailed Dec. 20, 2013, in co-pending U.S. Appl. No. 13/770,230.
A123 Systems, (2012), "Nanophosphate® Lithium Ion Prismatic Pouch Cell. AMP20m1HD-A" Datasheet, [online]. Retrieved from: http://info.a123systems.com/data-sheet-20ah-prismatic-pouch-cell, 2 pages.
Cairns et al., "Batteries for Electric and Hybrid-Electric Vehicles" *Annu. Rev. Chem. Biomol. Eng.*, 1:299-320 (2010).
Craven, "Horizon® sealed lead acid battery in electric vehicle application" 11th Annual Battery Conference on Applications and Advances, 1996. *IEEE Conference Publication*, Identifier No. 10.1109/BCAA.1996.484987; pp. 159-162 (1996).
D'Alkaine et al., "Processes involved in charging of discharged lead-acid battery electrodes by pulse methods. I. Qualitative Analysis for flat negative electrodes" *J. Power Sources*, 158:997-1003 (2006).
Emmett, "A Battery for All Seasons?: VRLA batteries are a mainstay for remote power applications. But can they really hold up in harsh environments?" originally published in *Telephony*, 234(4):P8-P14 (Jan. 26, 1998). Retrieved online: www.connectedplanetonline.com.
Hund, "Capacity Loss in PV Batteries and Recovery Procedures" Photovoltaic System Applications Department, Sandia National Laboratories, 1999, 12 pages.
International Search Report and Written Opinion issued in International Patent Application No. PCT/US2013/20813, mailed May 20, 2013 (12 pages).
International Search Report and Written Opinion issued in International Patent Application No. PCT/US2013/21287, mailed May 21, 2013 (14 pages).
International Search Report and Written Opinion issued in International Patent Application No. PCT/US2013/030855, mailed May 24, 2013 (6 pages).
International Search Report and Written Opinion issued in International Patent Application No. PCT/US2013/040862, mailed Oct. 2, 2013 (7 pages).
James et al., "Application of pulse charging techniques to submarine lead-acid batteries" *J. Power Resources*, 162:878-883 (2006).
Kim et al., "Fast-charging of a lead-acid cell: effect of rest period and depolarization pulse" *J. Power Sources*, 89:93-101 (2003).
Lam et al., "Pulsed-current formation of tetrabasic lead sulfate in cured lead/acid battery plates" *J. Power Sources*, 42:55-70 (1993).
Lam et al., "Failure mode of valve-regulated lead-acid batteries under high-rate partial-state-of-charge operation" *J. Power Sources*, 133:126-134 (2004).
*Handbook of Batteries*. Third Edition. D. Linden and T. Reddy (Eds.), McGraw-Hill, 2002; Chapters 22 and 23, pp. 22.3-23.88.
*Linden's Handbook of Batteries*. Fourth Edition. T. Reddy (Ed.), New York: McGraw-Hill, 2011; Chapter 29, pp. 29.3-29.48.
*Linden's Handbook of Batteries*. Fourth Edition. T. Reddy (Ed.), New York: McGraw-Hill, 2011; pp. 2.2-2.3.
Nolan et al., "EIS Modeling of Batteries Subjected to Interfacial Process Stimulation" Presented at Battery Congress 2011, Global Automotive Management Council (GAMC), Ann Arbor, Michigan, USA, Apr. 11-12, 2011. *Proceedings*. Curran Associates, Inc., Jul. 2011; vol. 60, pp. 44-58.
Saur et al., "Charging performance of automotive batteries—An underestimated factor influencing lifetime and reliable battery operation" *J. Power Sources*, 168:22-30 (2007).
United States Environmental Protection Agency, "Final Rulemaking to Establish Light-Duty Vehicle Greenhouse Gas Emission Standards and Corporate Average Fuel Economy Standards. Regulatory Impact Analysis" EPA-420-R-10-009, Apr. 2010 [online]. Retrieved from the Internet: http://www.epa.gov/oms/climate/regulations/420r10009.pdf (474 pages).
Wikipedia, "Lead-Acid Battery" [online]. Retrieved from: http://en.wikipedia.org/wiki/Lead_acid_battery, 15 pages (2013).
Zhang et al. "The effects of pulse charging on inner pressure and cycling characteristics of sealed Ni/MH batteries" *J. Power Sources*, 136:180-185 (2004).
International Search Report and Written Opinion issued in International Patent Application No. PCT/US2014/72846, mailed Mar. 20, 2015 (11 pages).
Jay et al., "Military Qualification of a high-reliability, light-weight 24V/30Ah aircraft battery," The Fifteenth Annual Battery Conference on Applications and Advances, IEEE (2000).
Office Action (Final) mailed Jul. 7, 2015, in co-pending U.S. Appl. No. 14/145,899.
Office Action (Final) dated Aug. 11, 2015, co-pending U.S. Appl. No. 13/350,686.
Office Action (Final) mailed Oct. 7, 2015, in corresponding U.S. Appl. No. 14/145,640.
Office Action (non-final) mailed Nov. 17, 2015, in co-pending U.S. Appl. No. 14/482,323.
Office Action (non-final) mailed Nov. 23, 2015, in co-pending U.S. Appl. No. 14/145,692.
Office Action mailed Feb. 19, 2015 in co-pending U.S. Appl. No. 13/350,686.
Abstract—JP 5-129014.
ASTM, "Metals Test Methods and Analytical Procedures," 1986 Annual Book of ASTM Standards, vol. 03.03 (ASTM E112-85) (22 pages).
Doring, et al., "Materials for Bipolar Lead-Acid Material," In New Promising Electrochemical System for Rechargeable Batteries (pp. 3-13), Sringer Netherlands (1996).
International Search Report and Written Opinion issued in International Patent Application No. PCT/US2013/55382, mailed Mar. 18, 2014.
International Search Report and Written Opinion issued in International Patent Application No. PCT/US2014/15953, mailed May 14, 2014.
Jay et al., "Improved Cycle Life Performance of the Horizon C2M Battery," Society of Automotive Engineers, Inc. Presentation 1998.
Office Action (Final) mailed Apr. 24, 2014, in co-pending U.S. Appl. No. 13/350,505.
Office Action (Final) mailed Jun. 16, 2014, in co-pending U.S. Appl. No. 13/475,484.
Office Action (Final) mailed May 7, 2014, in co-pending U.S. Appl. No. 13/768,192.
Office Action (non-final) mailed Feb. 4, 2015, in co-pending U.S. Appl. No. 13/626,426.

(56) References Cited

OTHER PUBLICATIONS

Office Action (non-final) mailed May 19, 2014, in co-pending U.S. Appl. No. 13/770,230.
Office Action mailed Jul. 9, 2014 in co-pending U.S. Appl. No. 13/626,426.
Office Action mailed Jun. 2, 2014, U.S. Appl. No. 13/419,678.
Office Action mailed Nov. 17, 2014, in co-pending U.S. Appl. No. 13/350,505.
Office Action mailed Nov. 19, 2014, in co-pending U.S. Appl. No. 13/843,953.
Office Action mailed Nov. 5, 2014 in co-pending U.S. Appl. No. 13/419,678.
Office Action mailed Sep. 22, 2014 in co-pending U.S. Appl. No. 13/626,426.
XP-002723755, Database EPODOC.

* cited by examiner

| EPS Alloy # | Alloy | Avg Grain Size [μm²] |
|---|---|---|
| Alloy-0 | Pb | 1.1 ± 0.3 |
| Alloy-1 | Pb-Sn-Se | 0.24 ± 0.1 |
| Alloy-2 | Pb-Sn | 1.0 ± 0.7 |
| Alloy-3 | Pb | 0.41 ± 0.1 |
| Alloy-4 | Pn-Sn-Ag | 0.12 ± 0.04 |

Fig. 11

| Pb Alloy Tested | Corrosion Rate (mm per year) |
|---|---|
| Alloy 1 | 0.034 |
| Supplier-1 | 0.067 |
| Alloy 4 | TBD |
| Alloy 3 | 0.103 |
| Pb (no glass core) | 0.106 |
| Alloy 0 | 0.111 |
| Alloy 2 | 0.205 |

METALLIC ALLOYS HAVING AMORPHOUS, NANO-CRYSTALLINE, OR MICROCRYSTALLINE STRUCTURE

RELATED APPLICATIONS

This application is a continuation-in-part of, and claims priority to, U.S. patent application Ser. No. 13/350,505, entitled Improved Substrate for Electrode of Electrochemical Cell, filed Jan. 13, 2012, by Subhash Dhar, et al. This application incorporates by reference the entire disclosure of U.S. application Ser. No. 13/350,505, entitled, "Improved Substrate for Electrode of Electrochemical Cell," filed Jan. 13, 2012, by Subhash Dhar, et al., the entire disclosure of U.S. application Ser. No. 13/350,686, entitled, "Lead-Acid Battery Design Having Versatile Form Factor," filed Jan. 13, 2012, by Subhash Dhar, et al., the entire disclosure of U.S. patent application Ser. No. 13/475,484, entitled "Lead-Acid Battery with High Power Density and High Energy Density," filed May 18, 2012, by Subhash Dhar, et al., the entire disclosure of U.S. patent application Ser. No. 13/626,426, entitled "Lead-Acid Battery Design Having Versatile Form Factor," filed Sep. 25, 2012, by Subhash Dhar, et al., and the entire disclosure of U.S. patent application Ser. No. 13/768,192, entitled "Improved Active Materials for Lead Acid Battery," filed Feb. 15, 2013, by Subhash Dhar, et al.

TECHNICAL FIELD

The present disclosure relates generally to improved materials and, in particular, improved metal alloys. Specifically, embodiments of the present disclosure have particular application in energy storage and conversion devices. For example, they may be used to form wires, woven materials, grids, and other substrates. These, in turn may be used in electrochemical cells, fuel cells, and other energy storage and conversion devices. More particularly, embodiments of the present disclosure may be formed into wires, woven materials, or grids that can be used as substrates for lead-acid electrochemical cells. Embodiments of the present disclosure may be used in electrochemical cells for vehicle propulsion for electric and hybrid-electric vehicles, as well as for stationary power applications, and other applications.

BACKGROUND

Lead-acid electrochemical cells have been commercially successful as power cells for over one hundred years. For example, lead-acid batteries are widely used for starting, lighting, and ignition ("SLI") applications in the automotive industry.

As an alternative to lead-acid batteries, nickel-metal hydride ("Ni-MH") and lithium-ion ("Li-ion") batteries have been used for electric and hybrid-electric vehicle applications. Despite their higher cost, Ni-MH and Li-ion electro-chemistries have been favored over lead-acid electrochemistry for some applications due to their higher specific energy and energy density compared to prior known lead-acid batteries.

Some lead-acid electrochemical batteries are made up of multiple electrochemical cells. Each cell includes a positive plate, a negative plate, a separator, electrolyte, and current collector. In some batteries, a casing surrounds stacked electrodes to form a module; in others, each cell is isolated in its own casing. For example, a 12-volt car battery has 6 cells of 2-volts each, each in a separate section of the battery casing to isolate each cell.

The positive and negative plates may have a substrate and active material applied over the substrate. In conventional lead-acid batteries, the substrate is typically a lead-alloy plate. The lead-alloy may be one of lead-alloy; lead-tin alloy; lead-tin-calcium alloy; or other suitable alloys, The plate is typically used to retain the active material and collect and distribute current throughout the plate.

Substrates may also be made of wires. For example, wires may be woven into a sheet suitable for performing the same functions as an expanded grid.

Prior known substrates are subject to corrosion. Corrosion may be driven by either the electrochemistry of the electrolyte/electrode couple or the electrical potential region at which the electrodes and active materials are operated. This phenomenon occurs in various electrochemistries and in particular in the lead-acid case, where the active material takes part in oxidation and reduction reactions. Specifically, the sulfuric acid electrolyte may change concentration during charge and discharge of the battery, and may attack the substrate material. Over the life of the battery, corrosion consumes the substrate material. Corrosion due to repeated cycling may cause the substrate to lose its function of supporting the active material; or collecting and distributing current.

Some corrosion may be desirable. Upon activation, a limited amount of corrosion may help bond the active material to the substrate, both chemically and electrically. Preferably the corrosion process would be stopped after this beneficial effect has been obtained. Arresting corrosion, however, may be difficult or even impossible. The core mechanism of the electrochemical cell may rely on the corrosion, or reduction-oxidation, reaction. Upon cycling, the active materials may change over time. In particular, it may change in volume and dilate. The oxide layer at the grid/active material interface may break down and expose new lead to the corrosion reaction. This process repeats with continued cycling, deteriorating the substrate. In practice, it may not be possible to stop the corrosion reaction at the optimal time.

To compensate for the corrosion, battery designers may be forced to add additional lead material. This addition increases the weight of the battery, thus reducing specific power and energy. Alternatively, designers may select alloying elements to inhibit corrosion. Designers may also accept that the grid has a hunted life and warrant their products only up to the limits of cycle life imposed by corrosion processes.

Thus there remains a need for substrate materials that resist corrosion after the beneficial adhesion layer between active material and substrate is formed. Preferably the substrate would corrode slowly, if at all. This may enhance cycle life of the energy storage or conversion device in which the material is used.

These above corrosion effects may also occur in alternative electro-chemistries, such as those of Ni-MH and Li-ion batteries. Therefore, these alternative batteries may also benefit from improved alloy materials that better resist corrosion.

SUMMARY

In various embodiments, a metal alloy for use in a wire included in an electrochemical cell has an amorphous structure, microcrystalline grains, or grains that are sized less than about one micron.

In various embodiments, a metal alloy for use in a wire included in an electrochemical cell has microcrystalline grains. In some embodiments, the metal alloy is a lead alloy.

In some embodiments, the lead alloy is selected from the group consisting of pure lead (99.9% Pb, 99.99% Pb), lead-tin-selenium, Pb-0.5~2.0% Sn-0.010~0.099% Se), lead-tin (Pb-0.5~2.0% Sn), and lead-tin-silver (Pb-0.5~2.0% Sn-0.010~0.050% Ag). In some embodiments, the microcrystalline grains are not generally longitudinally oriented, are variably oriented, or are randomly oriented. In some embodiments, the microcrystalline grains lack uniform grain size or are variably sized.

In some embodiments, the microcrystalline grains have an average grain size of less than or equal to 5 microns. In some embodiments, the metal alloy lacks long-range crystalline order among the microcrystalline grains. In some embodiments, the wire is used in a substrate used in the electrochemical cell. In some embodiments, the substrate is embedded in an active material. In some embodiments, the metal alloy is formed using a co-extrusion process. In some embodiments, the co-extrusion process comprises warming up the metallic alloy to a point below its melting point; and applying pressure to the alloy and simultaneously passing as core material through a die to obtain a composite structure. In some embodiments, the co-extrusion process comprises using an alloy that is formulated to he a glass-forming alloy; and extruding said alloy.

In some embodiments, the metal alloy is formed by extruding an alloy formulated using glass-forming elements comprising one or more metals selected from groups I-VIII of the periodic table of elements. In some embodiments, an amount of the glass former does not exceed 1% in weight. In some embodiments, the metal alloy is formed by quenching a supercooled or a molten metal alloy. In some embodiments, a cooling rate of the quenching is at or above 1,000,000 K/s.

In some embodiments, a metal alloy for use in a wire included in an electrochemical cell has an amorphous structure. In some embodiments, a metal alloy for use in a wire included in an electrochemical cell has grains that are sized less than about one micron. in some embodiments, the metal alloy is a lead alloy. In some embodiments, the grains are not generally longitudinally oriented, are variably oriented, or are randomly oriented. In some embodiments, the grains lack uniform grain size or are variably sized. In some embodiments, the grains have an average grain size of less than or equal to about five nanometers. In some embodiments, the metal alloy lacks long-range crystalline order among the grains. In some embodiments, the wire is a lead wire. In some embodiments, the wire is used in a substrate used in the electrochemical cell. In some embodiments, the substrate is embedded in active material.

BRIEF DESCRIPTION OF THE DRAWINGS

The accompanying drawings, which are incorporated in and constitute a part of this specification, illustrate several embodiments consistent with the disclosure and together with the description, serve to explain the principles of the disclosure. The drawings are not necessarily to scale or exhaustive. Instead, emphasis is generally placed upon illustrating the principles of the disclosures described herein. In the drawings:

FIG. 11 is a table listing exemplary alloys that may be used for a substrate of an embodiment of the present disclosure and their respective average grain sizes.

FIG. 16 is a table of measured corrosion rates of the alloys depicted in FIG. 15.

DETAILED DESCRIPTION OF THE EMBODIMENTS

Reference will now be made in detail to embodiments of the present disclosure. Embodiments of the present disclosure are described below and illustrated in the accompanying drawings. Wherever possible, the same reference numbers will be used throughout the drawings to refer to same or like parts.

Embodiments of the present disclosure comprise an improved metallic alloy that may be used as a substrate for an electrode of an electrochemical cell, in particular, the alloys of the present disclosure may have particular application in lead-acid electrochemical cells. Embodiments of the present disclosure comprise alloys having crystalline structures lacking long-range order. These may include microcrystalline structures with an average grain size of less than or equal to about 1 micron, nanocrystalline structures, and amorphous structures lacking long-range order. The improved structures of alloys of the embodiments of the present disclosure may provide with increased tensile strength and increased resistance to corrosion in acidic or alkaline media.

Embodiments of the present disclosure may be made by any of a wide variety of methods well known in the art. Various embodiments may be created via co-extrusion along with varying alloy composition, quenching, or a combination of two or more of these techniques. Additionally, various embodiments may use the recrystallization-inducing mechanical techniques of work hardening and heat treatment, e.g. calendaring, rolling, drawing from a solid metal billet and treating the produced pieces in a heated environment. Other embodiments may include use of mechanical alloying techniques to produce amorphous materials, e.g. using an attritor wherein high impact grinding causes solid state diffusion to occur between two or more materials suitable for making a current collector.

Metal alloys of embodiments of the present disclosure may be formed by a co-extrusion process. The wires have then been used to weave a mesh substrate. Active material is applied to the substrate to form electrodes, which are then assembled in to electrochemical cells.

Various embodiments use composites. The purpose of the core material may be to prevent the lead or other metallic alloy from changing shape due to tensile mechanical stresses. Hence, some embodiments include a core material.

In an embodiment, during co-extrusion, the alloy may he pressed through a die and applied to form an annulus around a core. The core may be glass fiber core, carbon fiber, or any other suitable material with high tensile strength. As the metal alloy is co-extruded, the metal alloy is mechanically attached to the core. This mechanical operation produces material grains that are deformed, recrystallized, and refined to a small size. In some embodiments, the grains are below 1 micron and may lack long-range crystalline order.

Figure 1A:
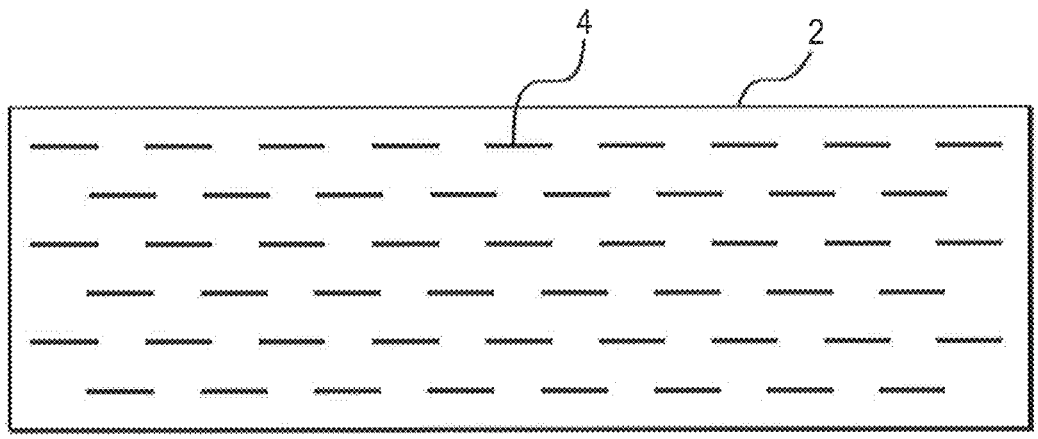
FIG. 1A is a schematic diagram of an exemplary expanded metal grid prior to expansion.
Figure 1B:
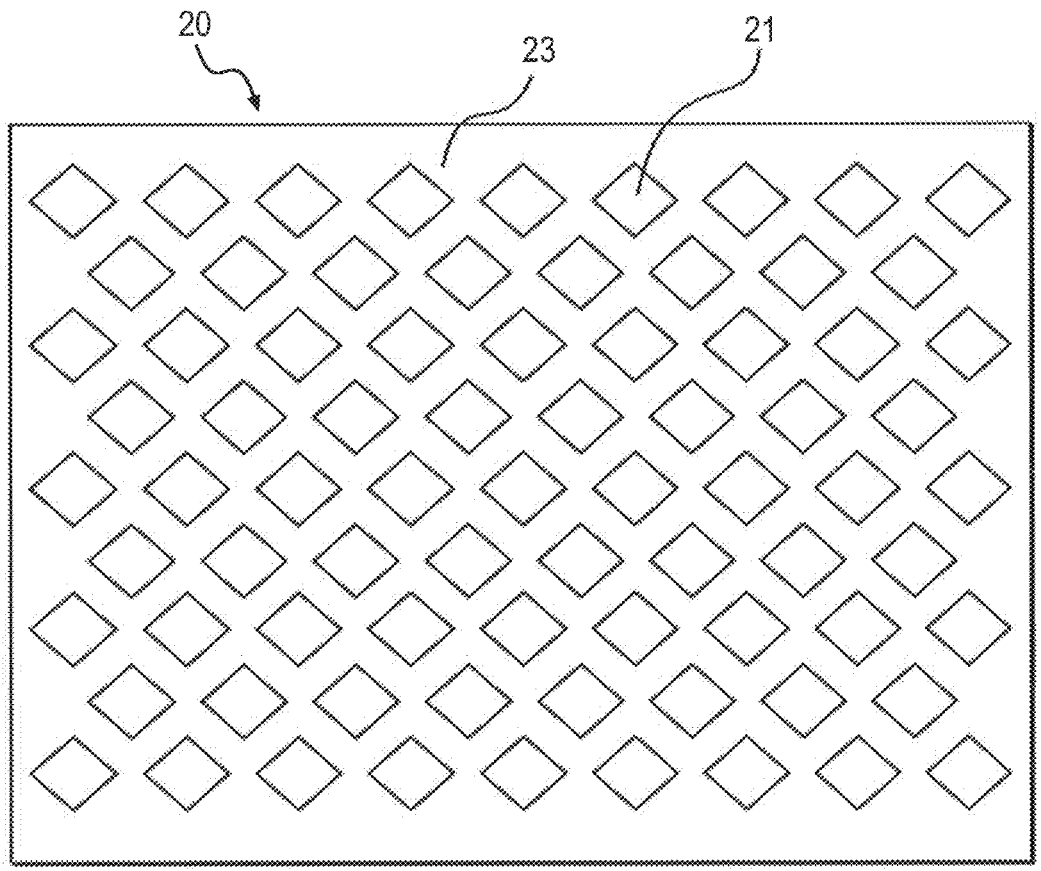
FIG. 1B is a schematic diagram of an exemplary expanded metal grid after expansion.

FIG. 1A depicts an exemplary substrate in its early stages of formation, consistent with one embodiment of the present disclosure. As shown in FIG. 1A, the substrate may be a metal sheet 2, which is perforated with a plurality of slits 4, so that, when the metal sheet 2 is expanded, it forms an expanded metal grid 20 as shown in FIG. 1B. The expanded metal grid 20 may include a plurality of diamond shaped apertures 21 formed therein as the metal sheet 2 is expanded. Expanded metal grid 20 may effectively consist of a plurality of elongate members 23 that bound the diamond shaped apertures 21, and make up the structure of the grid 20.

As will be described in more detail below, expanded metal grid 20 may be coated with a conductive coating of lead, forming a substrate for assembly of an electrode plate. The substrate may also serve as a current collector for the electrode plate. By forming the electrode from an expanded metal sheet 20, manufacturing costs and material use may be minimized. Moreover, the shape of expanded metal grid 20 may function as an effective substrate to which intermediate coatings, active material, or other coatings may be applied.

Figure 2A:
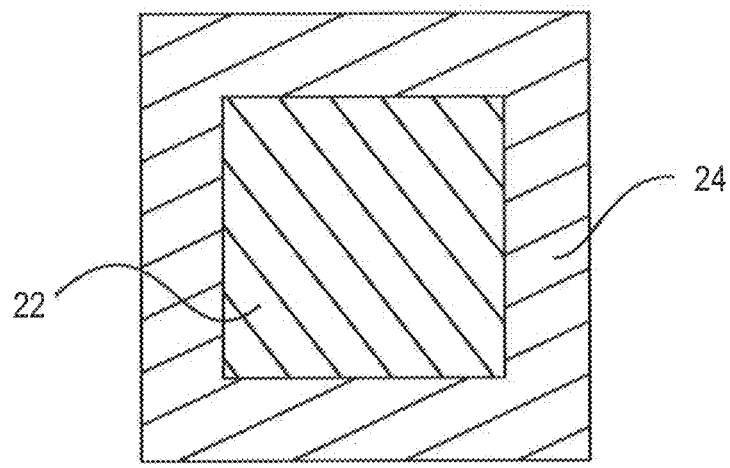
FIG. 2A is a cross-sectional view of the grid material of FIG. 1B, coated with a conductive lead coating consistent with one embodiment of the disclosure.

FIG. 2A depicts a cross-sectional view of one of the elongate members 23 that form the expanded metal grid 20. As shown in FIG. 2A, the elongate members 23 that form expanded metal grid 20 may include a core material 22 and a conductive lead coating 24. The core material 22 may be made from any suitable material selected for strength, light weight, and good compatibility with conductive lead coating 24. Additionally, the core material may be selected from the list including, but not limited to, carbon fibers, carbon nanotubes, and graphene materials to further enhance the effective electrical conductivity of the composite substrate. For example, the core material 22 may be selected from one or more of lead, titanium, or glass fiber. The conductive lead coating 24 may have a material structure that promotes conductivity, including without limitation, microcrystalline, nanocrystalline, or amorphous structure. In other words, the material structure of the conductive lead coating 24 may lack long-range crystalline order and/or may lack grain boundaries.

In one embodiment, the core material 22 of expanded metal grid 20 may be made from a material selected from the group tantalum, tungsten, zirconium, and essentially titanium. The present inventors intend that a material be considered essentially titanium, in spite of the presence of inclusions, contaminants, or even alloying elements, providing these further amendments do not alter or modify the material properties of the titanium as used in the electrochemical cell. In one embodiment, the conductive coating 24 comprises a non-polarizing material. For example, the conductive coating 24 be made from a material selected from lead, lead dioxide, alpha lead dioxide, beta lead dioxide, titanium nitride, tin oxide, or silicon carbide. in addition, the. conductive. coating may be formed by one or more of the techniques of electroplating, electro-winning, electroless deposition, dip coating, spraying, plasma spraying, physical vapor deposition, ion-assisted physical vapor deposition, chemical vapor deposition, plasma enhanced chemical vapor deposition, or sputtering.

In one embodiment, the core material 22 may selected from one or more of the following materials: fiberglass, carbon fiber, graphite, basalt fiber, silicon, silicon carbide, indium-tin-oxide, palladium, platinum, ruthenium, ruthenium oxide, rhodium, high-strength polypropylene, poly tetra fluoro-ethylene, conductive plastic fiber, and aromatic polyamide. ha one embodiment, the core material 22 may he a metal or metal oxide that is electrically conductive, thermally stable, and chemically resistant.

Figure 2B:
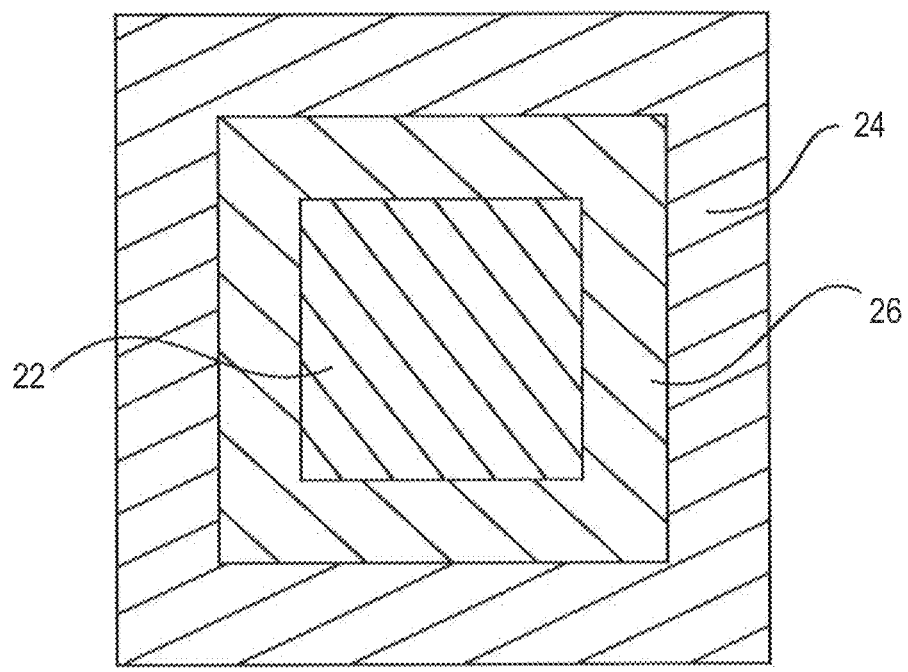
FIG. 2B is a cross-sectional view of the grid material of FIG. 1B having an intermediate coating and a conductive lead coating consistent with another embodiment of the disclosure.

FIG. 2B depicts another exemplary embodiment of the elongate members 23 of expanded metal grid 20. In particular, the elongate members may include a core material 22, an intermediate layer 26, and the conductive lead coating 24. The intermediate layer 26 may he selected based on its compatibility with core material 22 and conductive lead coating 24, and selected to enhance the bonding of the conductive lead coating 24 to the core material 22. One means of achieving good adhesion may include choosing a core material 22 that has similar mechanical properties to those of the conductive lead coating 24 and/or intermediate coating 26. For example, in one embodiment, core material 22 may be titanium and intermediate coating 26 may be lead dioxide, since titanium and lead dioxide have similar coefficients of thermal expansion.

For example, intermediate coating 26 may be a metal or metal oxide that is electrically conductive, thermally stable, and chemically resistant. For example, the conductive intermediate layer may be made from a material selected from palladium, platinum, ruthenium, ruthenium oxide, and rhodium. The conductive intermediate coating may be formed by one or more of the techniques of electroplating, electro-winning, electroless deposition, dip coating, spraying, plasma spraying, physical vapor deposition, ion-assisted physical vapor deposition, chemical vapor deposition, plasma enhanced chemical vapor deposition, or sputtering.

As an alternative to expanded metal grid 20, the substrate may be a sheet of material having aligned, dimple-like spaces. The spaces may be punched, molded, or otherwise formed into the metal sheet. The spaces, like diamond shaped apertures 23, may accommodate and secure active material affixed to the resulting electrode. Accordingly, the substrate may include any configuration allowing for structural support of the active material.

A further alternative embodiment is to form a sandwich structure of either a single metal grid 20 or two metal grids 20, with a foil of conductive material disposed between the two grids or compressed into the grid(s). The grid and foil may be rolled together between rollers so that foil is located in the center of the grid and compressed into the grid. In certain embodiments, the grid may grip or bite into the lead foil, providing improved conductivity between the foil and the grid.

A conductive intermediate layer that is electrically conductive, thermally stable, and chemically resistant, may be disposed between the grid 20 and the conductive foil. If employed, the conductive intermediate layer may comprise one or more of palladium, platinum, ruthenium, ruthenium oxide, rhodium, or a non-polarizing, material. The conductive intermediate layer is formed by one or more of the techniques of electroplating, electro-winning, electroless deposition, dip coating, spraying, plasma spraying, physical vapor deposition, ion-assisted physical vapor deposition, chemical vapor deposition, plasma enhanced chemical vapor deposition, or sputtering. The conductive foil may comprise lead.

Figure 3:
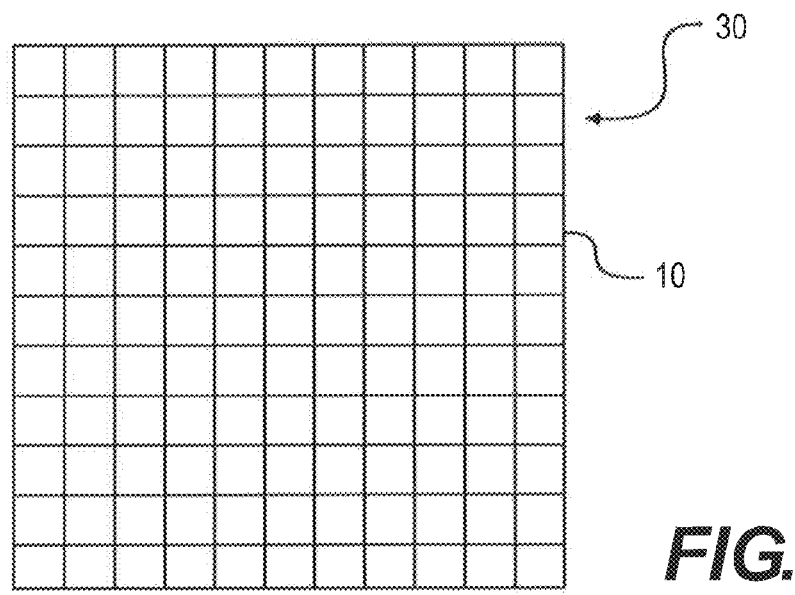
FIG. 3 is a schematic diagram of an exemplary wire substrate woven into a grid.

As yet another alternative to expanded metal grid 20, improved electrode substrates may be formed from a composite wire mesh or grid 30, as shown in FIG. 3. Wire grid 30 may be formed by weaving, fusing, molding, or otherwise manipulating an elongate composite wire 10 into the grid substrate. The process of making a wire grid 30 may include making a plurality of composite wires, each of which may be woven to form the mesh grid. Alternatively, the grid substrate may be formed by layering the plurality of wires in a criss-cross pattern and fusing them together with the application of heat. Alternatively, the mesh grid may be formed without fusing the wires at their crossing points. In one embodiment, the metal grid 30 may be made from a material selected from the group tantalum, tungsten, zirconium, and essentially titanium.

Figure 4A:
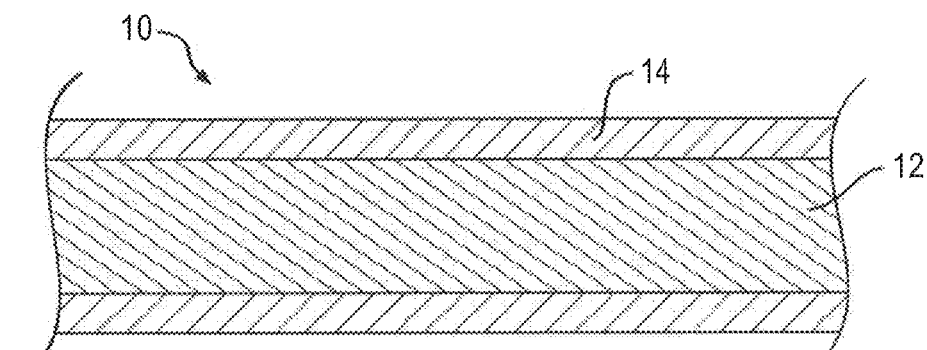
FIG. 4A is a longitudinal cross-sectional view of an exemplary wire substrate used to form the exemplary grid of FIG. 3, the wire substrate having a conductive lead coating consistent with another embodiment of the disclosure.
Figure 4B:
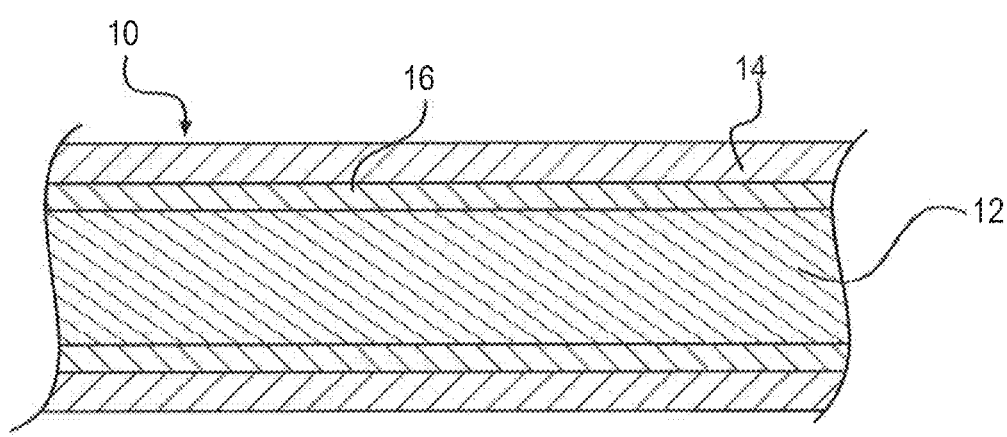
FIG. 4B is a longitudinal cross-sectional view of an exemplary wire substrate used to form the exemplary grid of FIG. 3, the wire substrate having a conductive lead coating and an intermediate coating consistent with another embodiment of the disclosure.

FIGS. 4A and 4B depict longitudinal cross-sections of an exemplary elongate composite wire 10, which can he assembled into the grid 30. As discussed above with respect to FIGS. 2A and 213, the composite wire 10 may include a core material 12 and a conductive lead coating 14, as shown in FIG. 4A. The core material 12 may be made from any suitable material selected for strength, light weight, and good compatibility with conductive lead coating 14. For example, the core material 12 may be selected from one or more of lead, titanium, or glass fiber. The conductive lead coating 14 may have a material structure that promotes conductivity, including without limitation, microcrystalline, nanocrystalline, or amorphous structure. In other words, the material structure of the conductive lead coating 14 may lack long-range crystalline order and/or may lack grain boundaries. As a further embodiment, as shown in. FIG. 4B, wire 10 may include an intermediate layer 16, which is selected to promote bonding of the conductive lead coating 14 to the core material 12. Core material 12 may be a fiber core, such as fiber glass, that provides sufficient strength to the substrate; and the coating 14 may be a lead coating, such as lead or lead-dioxide, providing sufficient corrosion resistance and conductivity to the lead composite wire.

Either of the composite wire 10 forming grid 30 or elongate members 23 forming sheet 20 may have any desired diameter and cross-sectional shape. For example, a wire having a fiber glass core may have a diameter of 100-900 microns. Alternatively, a wire having a carbon fiber core may have a diameter of 100-2,000 microns. In addition, in either embodiment, a lead coating may have a thickness of 10-30 microns.

Whether the substrate is formed as an expanded metal grid or a wire mesh, active material in the form of a paste may be applied to the substrate to form an electrochemical plate, The substrate may be any material that allows for sufficient strength and support of the active material, while including characteristics that improve power and energy of the lead-acid electrochemical cell. In addition, the substrate may be any material sufficiently compatible with the conductive lead coating to promote good adhesion.

In addition to lead, titanium, or glass fiber, core materials 12 or 22 may be formed of any suitable conductive material, including but not limited to, lead, copper, aluminum, carbon fiber, extruded carbon composite, carbon wire cloth, or any suitable polymeric compound known to those skilled in the art. Alternatively, the core material may be formed of a non-conductive material, including, but not limited to, fiberglass, optical fiber, polypropylene, high strength polyethylene, or fibrous basalt. Further, in addition to lead dioxide, intermediate coatings may include, but are not limited to, lead, titanium nitride, and tin dioxide. The thickness of the intermediate coating may depend on the type of conductive coating chosen. For example, if tin dioxide is used, the conductive coating may be a thin film. Alternatively, if lead dioxide or titanium nitride is used, the conductive coating may have a thickness between approximately 10 and 30 microns.

In certain embodiments, intermediate layer 16, 26 may be employed to promote adhesion between the core and the conductive coating. For example, an intermediate adhesion promoter may exist between the core and the conductive coating in order to increase the adhesive contact between core and conductive coating, The intermediate layer may include any suitable thickness in order to provide the desired adhesive contact between the core and conductive coating. The intermediate adhesion promoter may include, but is not limited to, lead-dioxide, tin-dioxide, conductive titanium oxide, carbon, and titanium-nitride. Similar to the conductive coating, the intermediate adhesion promoter may be chosen based on compatibility with the core material. For example, carbon may be chosen as intermediate adhesion promoter for a fiberglass core, and tin-dioxide, lead dioxide, conductive titanium oxide, or titanium nitride may be chosen as intermediate adhesion promoter for a titanium core.

Further, if lead dioxide is employed, alpha lead dioxide or beta lead dioxide may be employed to enhance adhesion (alpha) and conductivity (beta). Alternatively, the intermediate layer may comprise one or more of titanium nitride, tin oxide, and silicon carbide.

Figure 5A:
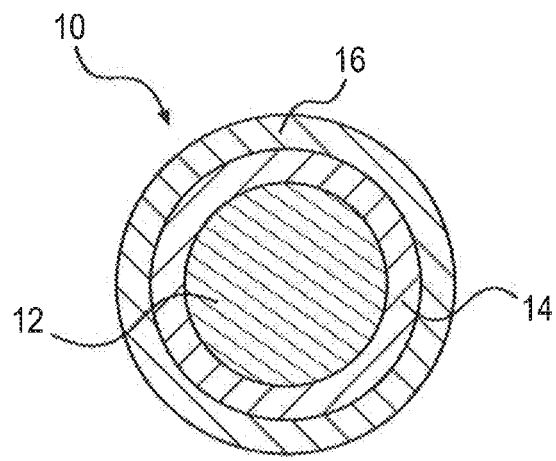
FIG. 5A is a transverse cross-sectional view of an exemplary wire substrate used to form the exemplary grid of FIG. 3, the wire substrate having a conductive lead coating and an intermediate coating, consistent with another embodiment of the disclosure.
Figure 5B:
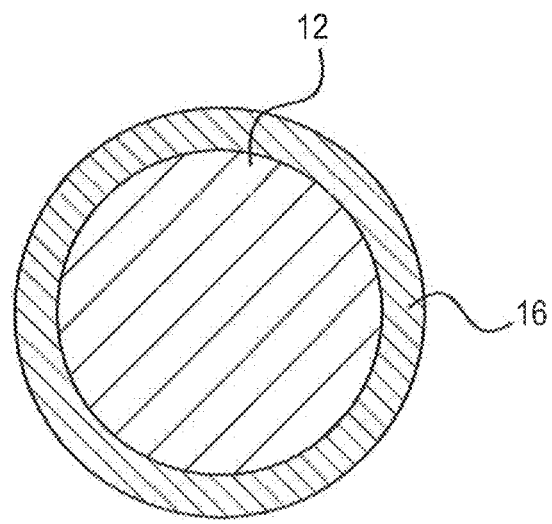
FIG. 5B is a transverse cross-sectional view of an exemplary wire substrate used to form the exemplary grid of FIG. 3, the wire substrate having a conductive lead coating, consistent with another embodiment of the disclosure.

Composite wire 10 may further include any desired diameter sufficient to provide a substrate having suitable strength and electrical conductivity. For example, the diameter of a lead wire may he in the range of 100-2,000 microns. The wire also may include any suitable cross-sectional shape which allows for its use in the formation of sheet 20 or grid 30. Suitable cross-sectional shapes may include, but are not limited to, circular, oval, rectangular, or square. For example, FIGS. 5A and 5B illustrate wire 10 having a circular transverse cross-section. Fig, 5A shows the wire 10 having a circular core material 12, intermediate layer 16, and conductive lead coating 14. FIG. 5B shows the wire 10 having a circular core material 12 and conductive lead coating 14. In either embodiment, of FIG. 5A or 5B, the core material 12 and intermediate layer 16 may be made from any of the materials discussed above with respect to FIGS. 2A-2B or 4A-4B.

Figure 6:
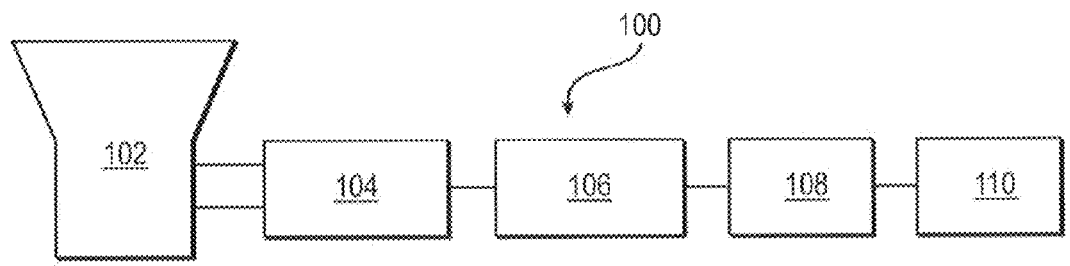
FIG. 6 is a schematic diagram of an exemplary manufacturing system and process for making a wire substrate consistent with embodiments of the present disclosure.

FIG. 6 depicts an embodiment of an exemplary system 100 for making a wire that can he formed into the substrate grid. Material that may he formed into the core may be placed into a metering device 102, such as a hopper. Core material may then be filtered and conveyed into a core-forming device 104, In one embodiment, core-forming device 104 may he one performing an extrusion process. The extrusion process may be enhanced with the use of ultrasonics and may include shaping the filtered material from the hopper into the core 12, 22, which may be an elongate member having a fixed cross-sectional profile. Shaping of the filtered material may include heating the material to achieve a malleable state and manipulating the heated material to achieve a desired thickness and length. Alternatively, the core-forming device may he one performing a wire drawing process known to those skilled in the art.

After shaping the core, if desired, the core may he coated with one or more intermediate adhesion promoters. Intermediate adhesion promoters may he applied through any suitable coating process known to those skilled in the art. Thus, a coating machine 106 may he selected based on the material and/or the desired thickness of the intermediate adhesion promoter. For example, for thicker coats, the process may include, but is not limited to, thermal spraying, dipping, and painting. Alternatively, for thinner coats, the process may include, but is not limited to, sputtering or vacuum deposition. Further, a process may be used that can produce a variety of desired thicknesses of intermediate adhesion promoters, such as chemical vapor deposition (CVD). Moreover, when a conductive core material is chosen, it may be desired to apply an intermediate adhesion promoter through an electrochemical application, such as plating.

If an intermediate adhesion promoter is applied, wire may proceed through a drying machine 108 in order to prepare the wire for application of the conductive coating. Finally, the conductive coating may be applied in a similar manner as the intermediate adhesion promoter. As such, the conductive coating machine 110 may be determined by the properties of the conductive coating being applied and the desired thickness of the conductive coating, Accordingly, the conductive coating machine 110 may include, but is not limited to, a machine adapted for CVD, sputtering, dipping, painting, thermal spraying, and/or electrochemical application.

Application of conductive coating 14, 24 and/or intermediate layer 16, 26 to core 12 may he accomplished in a way that optimizes the particle size of the coating. Although the conductive lead coating and intermediate layer may have various grain structures and orientations and deliver satisfactory performance, performance may be enhanced by controlling the grain structure of the conductive lead coating and, potentially, of the intermediate layer as well. For example, a lead coating comprising microcrystalline, nanocrystalline or amorphous material may deliver superior performance due to its increased conductivity and resistance to corrosion. Smaller particle sizes may be considered in the range of approximately 10-50 nm. Processes that produce these smaller particle sizes may include, but are not limited to, ultrasonic spraying and plasma spraying.

Substrates having amorphous, microcrystalline, or nanocrystalline grain structures may provide a substrate with good corrosion resistance and adhesion to the active material. In some embodiments, the conductive materials that make up the substrate, however, may include crystalline grain structures.

Accordingly, it may be desired to heat treat either the composite wire 10, expanded grid 20, or grid 30 to produce the desired grain structure. Lead wire, or composite wire (either with or without an intermediate coating) or grid may proceed through a heat treatment process, such as annealing, which may transform the crystalline grain structure of the conductive lead coating 14, 24 into one or more of amorphous, microcrystalline, or nanocrystalline grain structures. Annealing may be accomplished through heating, ultrasonic treatment, or any other appropriate means to produce the desired structure.

The active material may also be constructed to enhance performance of the resulting electrochemical cell electrode. The sizes, shapes, and densities of particles of the active material may be chosen so as to increase the ability of the active material to transport gas out of the material without impairing the flow of electrolyte, which may thereby increase the capacity and catalytic activity of the electrode plates.

Figure 7:
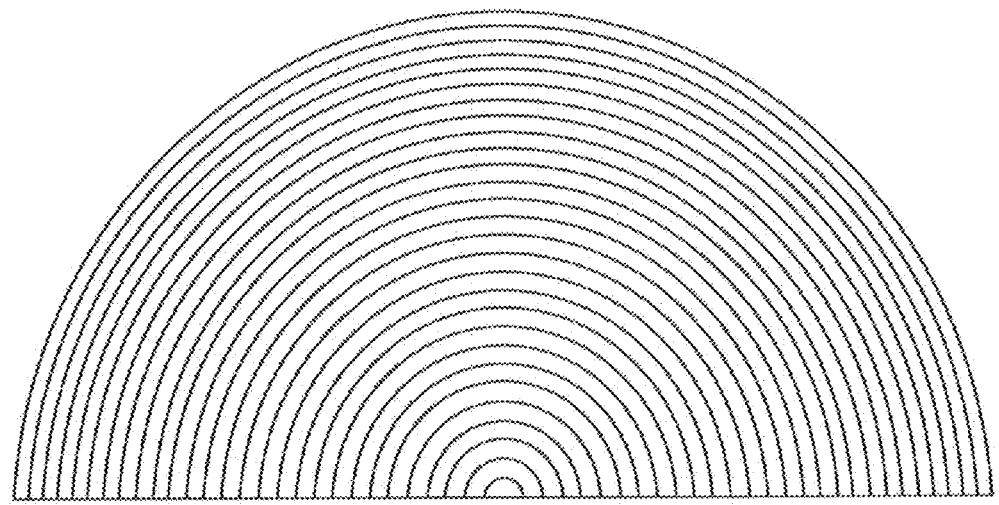
FIG. 7 is a schematic diagram of an exemplary semi-circular electrode formed from a wire substrate consistent with the present disclosure, the electrode formed so as to exhibit relatively constant current density.

Application of active material to the substrate may include placement of both positive and negative active material to surfaces of the substrate. In one embodiment, active material may he applied in manner that may create a bipolar design of the electrode. This may be accomplished by alternating positive and negative active material in each space on each side of the grid. Alternatively, in another embodiment, active material may be placed in a pseudo bi-polar design. The pseudo bi-polar design may be accomplished by the placement of both positive and negative active materials to alternating fields on the substrate. For example, pseudo bi-polar placement of active material may include, but is not limited to, the application of negative active material to one half of the substrate, along with the application of positive active material to the other half of the substrate as shown in FIG. 7. This pseudo bi-polar design may offer lower resistance and higher power of the lead-acid electrochemical cell. Further, it may enable the lead-acid electrochemical cell to operate at a lower temperature, which may reduce the need for collateral cooling equipment.

In yet additional embodiments, substrate and electrode plates may be formed in a semi-circular configuration. As depicted in FIG. 7, the mesh grid may be formed in a manner to provide a relatively constant current density by varying the distance between wires or current collector elements as one moves outward radially along the electrode plate.

Figure 8:
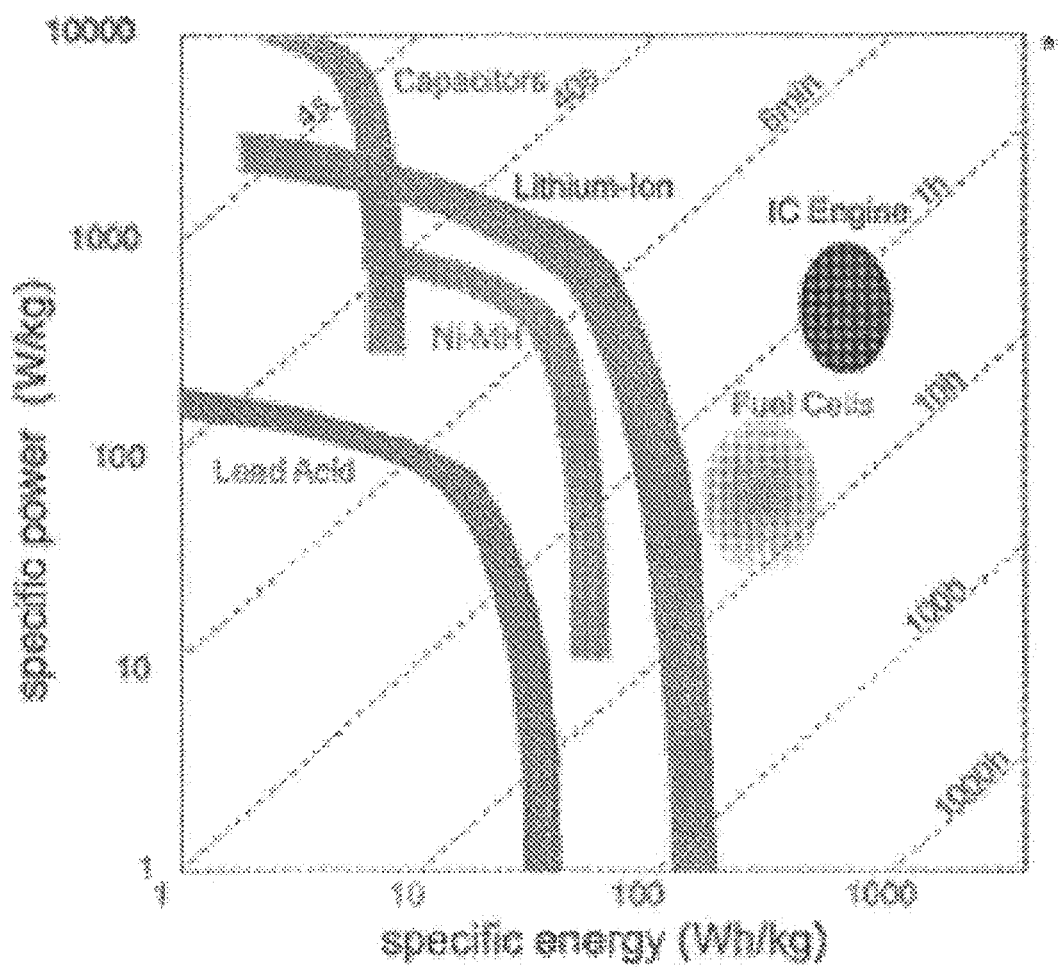
FIG. 8 shows Ragone plots of various types of electrochemical cells.

FIG. 8 shows a Ragone plot of various types of electrochemical cells that have been used in automotive applications, depicting their respective specific powers and specific energies compared to other technologies.

Further disclosed are improved alloys having amorphous, nanocrystalline, or other structure lacking long-range structural order. Some embodiments of the present disclosure are suitable for use as a substrate for energy storage and/or conversion applications. Specifically, an improved metal alloy wire having an amorphous structure or a nanocrystalline structure is provided. Some embodiments of the metal wire have a grain structure that exhibits no long-rage crystalline order.

Some embodiments of the present disclosure exhibit various properties that are desirable in energy storage and/or conversion applications. Specifically, metal alloys of some embodiments of the present disclosure possess metallic properties, such as high degree of electrical conductivity that are desirable properties of substrates.

Some embodiments of the present disclosure also exhibit a number of other desirable properties. First, they better resist corrosion than prior known alloys.

Second, alloys of the present disclosure exhibit desirable properties under stress. Specifically, amorphous, nanocrystalline, and microcrystalline embodiments of the present disclosure exhibit varying degrees of shear softening. Typical metal alloys will deform under elastic stress, until they reach a region in inelastic stress in which the structure deforms, before fracturing. Some embodiments of the present disclosure that exhibit shear softening continue to deform to a much greater degree than prior known alloys without fracturing. Alloys of the present disclosure that exhibit shear softening may deform under shear up to about 8000% without ultimate failure. The alloys exhibit behavior more analogous to flow than to the typical deformation and fracture response of prior known alloys.

Third, they may be more readily formed or shaped than prior known alloys. Specifically, they may be readily stamped, shaped, or extruded by conventional processes without an increase in the number of defects. The superior mechanical properties of amorphous metals may enable for the extrusion of thinner diameter wires than normally possible in conventional alloys. Once deployed as substrates, these wires impose a lower current density and enable thinner battery plates. As a result the lower current density in these thinner plates further enhances the cycle life of the battery and reduced substrate corrosion.

Fourth, in addition to having superior mechanical properties and having high electrical conductivity, substrates made of amorphous metal alloys also have high corrosion resistance and inertness that are useful in enhancing the cycle life and reducing decay due to undesired secondary chemical reactions.

The metal wire of some embodiments of the present disclosure is suitable for use as a substrate for an electrochemical cell and, in particular, batteries. More specifically, it may be used as the substrate for active material in lead-acid electrochemical cells. The improved metal wire of the present disclosure exhibits properties that may enhance performance of the electrochemical cell. It may exhibit lower internal resistance than prior known wires. It may also resist corrosion more effectively, potentially extending cycle life of the electrochemical cells in which it is used.

Figure 9A:
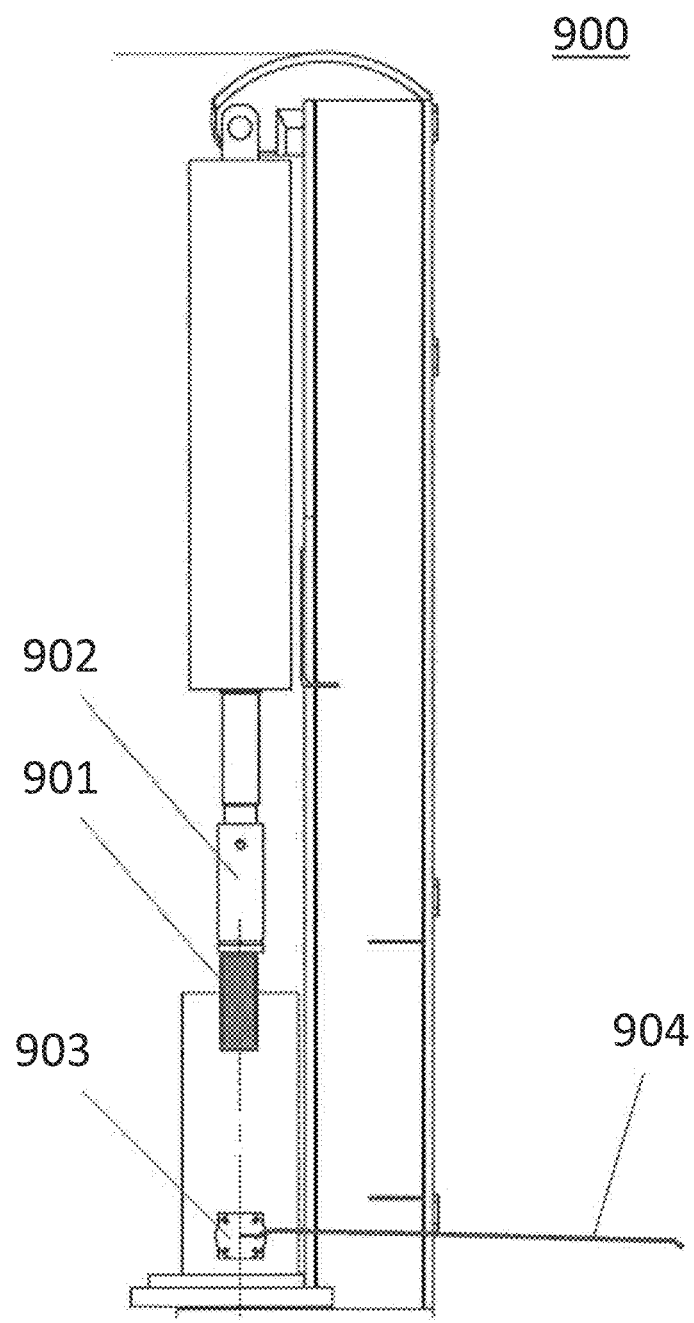
FIGS. 9A, 9B, and 9C are schematic diagrams of extruders according to various embodiments.

FIG. 9A is a schematic diagram of an exemplary extruder 900 according to some embodiments. After lead billet 901 is loaded on extruder head 902, it enters extrusion die 903 and pressed into extruded wire 904.

Figure 9B:
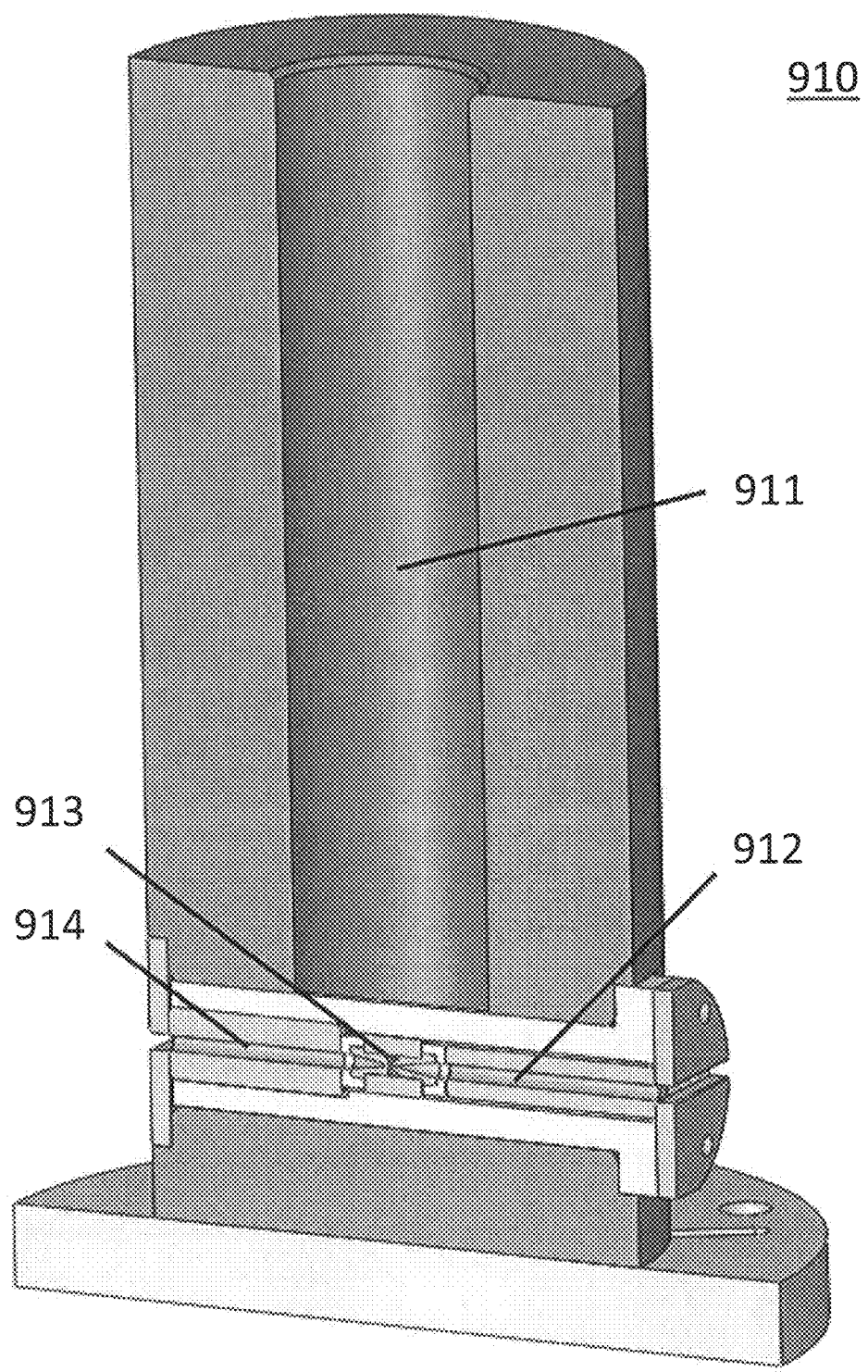
Figure 9C:
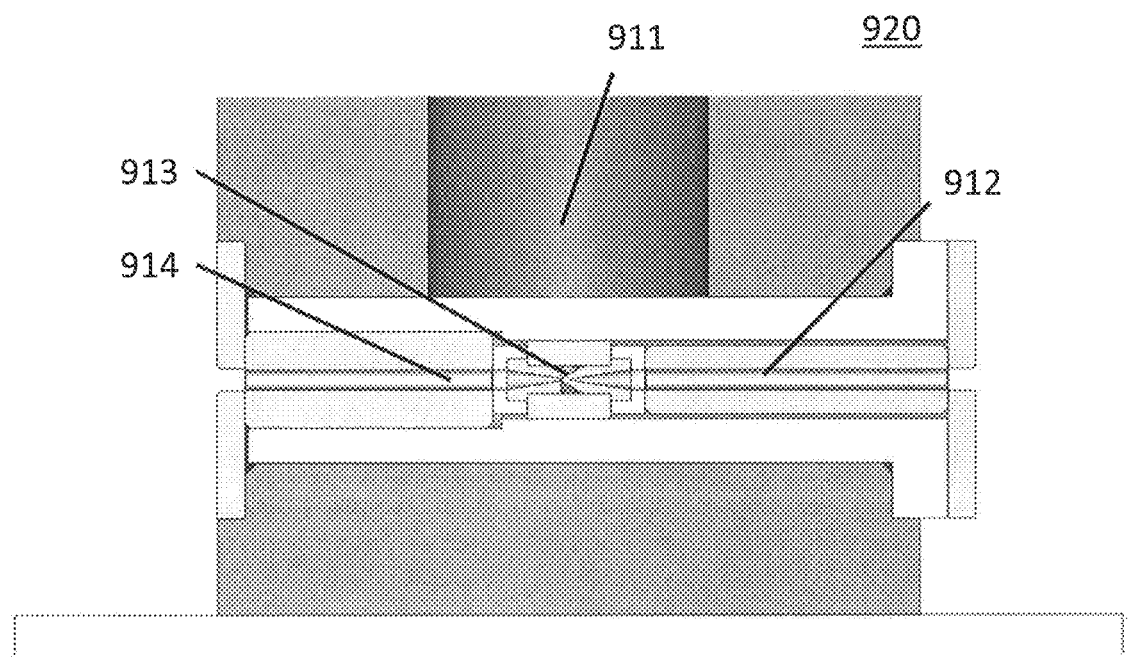

FIG. 9B is a schematic diagram of another exemplary extruder 910 according to some embodiments. FIG. 9C shows the same extruder 910 from another perspective 920. Molten lead is pushed down through hopper 911 as glass fiber is pushed from right to left in shaft 912, As the glass fiber moves through extrusion die 913, it is coated with lead. The lead-coated wire leaves extruder 910 via shaft 914.

Figure 10A:
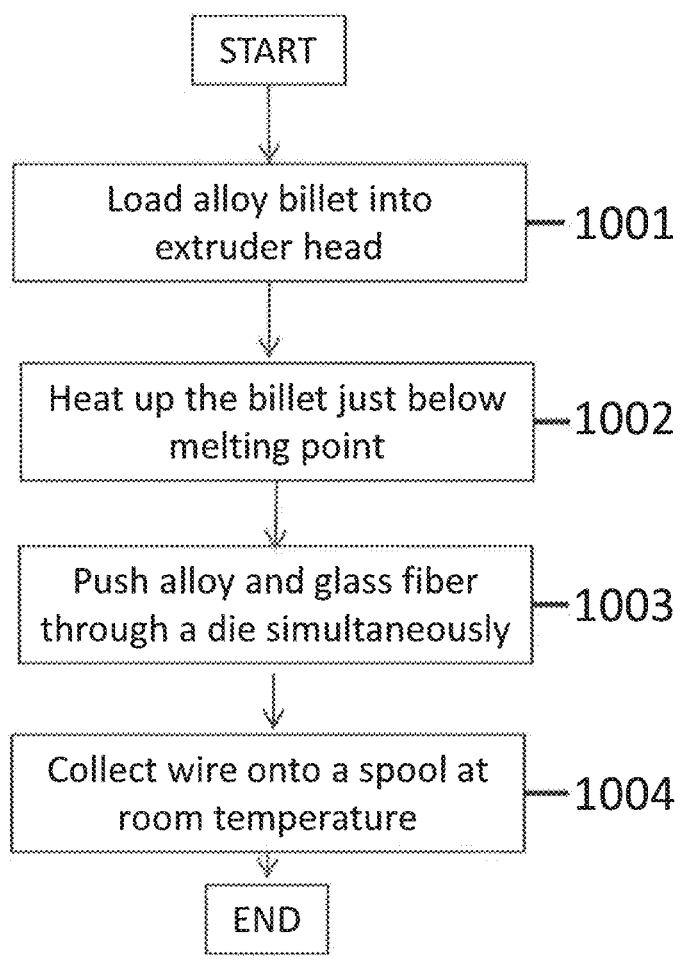
FIG. 10A is a flowchart depicting steps in a method of an embodiment of the present disclosure for extruding lead-coated wire.

FIG. 10A illustrates a process 1000 for manufacturing lead-coated wire 904, according to some embodiments. Process 1000 may be performed by one or more extruders. In step 1001, an alloy billet is loaded into extruder head 902. in step 1002, the alloy billet is heated. up to just below its melting point.

In step 1003, the alloy and a glass fiber are both pushed simultaneously through extrusion die 903 to form lead-coated. wire 904. In step 1004, the lead-coated wire 904 is collected onto a spool at room temperature. In some embodiments, the application causes the metallic alloy to mechanically attach the alloy to the glass core. In some embodiments, two pure metals are co-extruded together in the process to form two co-axial coatings around the core material.

Some embodiments use varying alloy composition for manufacturing a substrate lacking long-range order. In such embodiments, the alloy composition is varied by adding glass formers. In some embodiments, glass formers are metals from groups of the periodic table of elements. In some embodiments, the glass formers are added in quantities that do not exceed 1% of the total alloy weight. Elements such as selenium (Se), silver (Ag), or other metals from groups I-VIII of the periodic table of elements may be added in small quantities. Such additions may promote grain refinement by segregating at the grain boundaries and preventing recrystallization. Glass formers may thus reduce the grain size of the resultant crystallized metal.

Alternatively, in some embodiments, a metal billet alloy having glass forming composition is fed into the extruder. Some of these embodiments use process 1000 to produce wires. Some of these embodiments form amorphous structures by means of the alloying elements, i.e. the glass forming elements in addition to the manufacturing method itself.

Figure 10B:
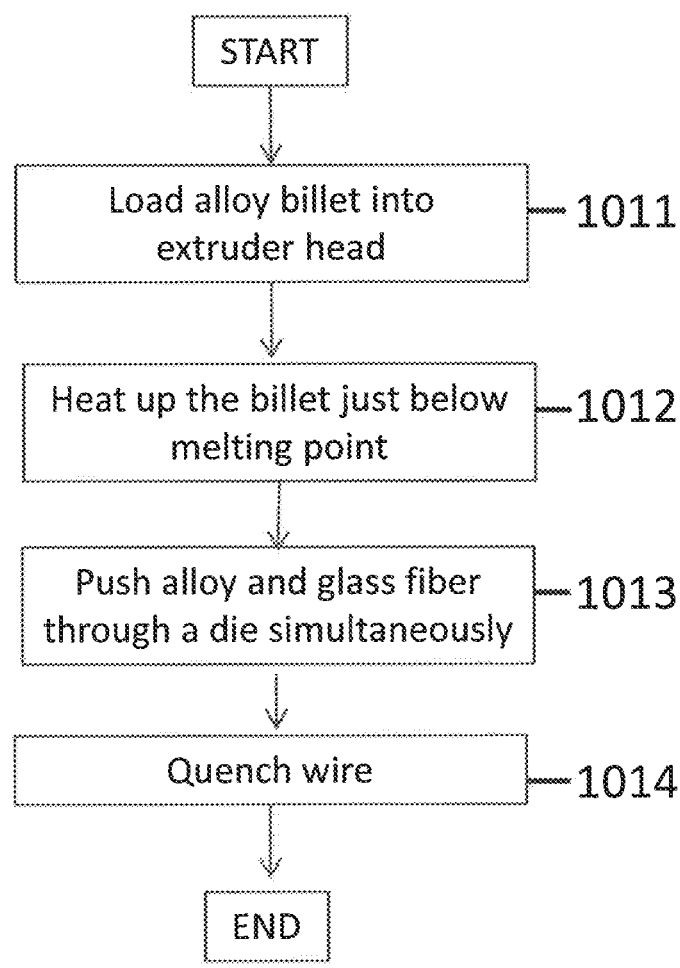
FIG. 10B is a flowchart depicting steps in a method of an embodiment of the present disclosure for extruding lead-coated wire produced via quenching of the extruded wire.

FIG. 10B illustrates a process 1010 for manufacturing a lead-coated wire via quenching of the extruded wire, according to some embodiments. Quenching includes rapidly cooling extruded or molten metal alloy. Since liquid forms of materials lack long-range order, hardening them at a sufficiently fast rate (such as $10^6$ K/s or higher) may lock in the disordered. structure before large crystals form. Process 1010 may be performed by one or more extruders.

In step 1011, alloy billet is loaded into the extruder head 902. In step 1012, the alloy billet is heated up to just below its melting point. In some embodiments, molten alloy may instead be created in a traditional metal alloy manufacturing method.

In step 1013, the alloy and a glass fiber are both pushed simultaneously through extrusion die 903 to form lead-coated wire 904. In some embodiments, the molten alloy is not extruded and it is melt spun to form a wire or a ribbon.

In step 1014, the lead-coated wire 904 is quenched, concluding the process. In some embodiments, the cooling rate during quenching is above 1,000,000 K/s.

Various embodiments use different compositions of alloys. FIG. 11 shows a table 1100 listing exemplary alloys for use as the substrate of an electrode of an electrochemical cell according to various embodiments and their respective average grain sizes. FIG. 11 includes three columns and five rows. The five rows list five lead-based alloys. The three columns list, for each alloy, the Energy Power Systems alloy number, the alloying elements, and the average grain size in square microns [$\mu m^2$]. For example, the top row lists Alloy-0, which comprises pure Pb and has an average grain size of 1.1±0.3 µm², The second row, on the other hand, lists Alloy-1, which comprises Pb, Sn, and Se, and has an average grain size of 0.24±0.1 µm².

FIGS. 12A, 12B, 13, and 14 are scanning electron microscope (SEM) photographs showing the structure of various exemplary of nanocrystalline and amorphous alloys according to some embodiments.

Figure 12A:
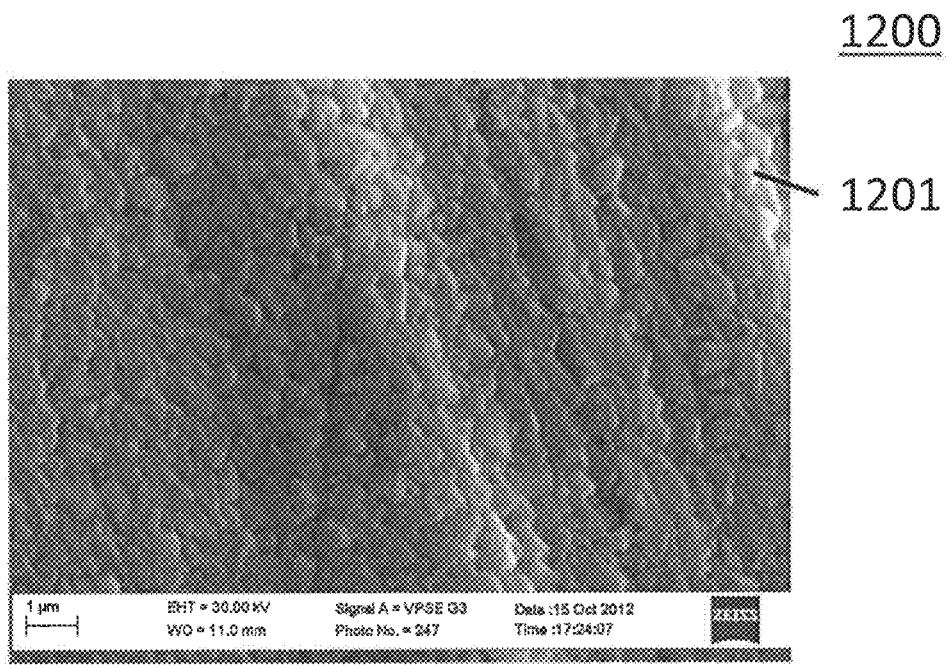
FIGS. 12A and 12B are scanning electron microscope (SEM) photographs showing the structure of nanocrystalline and amorphous alloys, respectively, of embodiments of the present disclosure.

FIG. 12A is an SEM image 1200 of a lead wire of an embodiment of the present disclosure produced by co-extrusion. Image 1200 depicts grain structure 1201 having grains with sizes that are smaller than 1 micron, according to sonic embodiments. In some embodiments, the grains are formed to have an average size of about a few microns. In some embodiments, on the other hand, the grains have an average size of a few hundred nanometers.

Image 1200 also indicates that the grains are not all oriented in one direction. Instead, the grains are variably oriented, that is, are generally oriented in different directions. In some embodiments, the grains are randomly oriented, Grains that are thus variably or randomly oriented will cause the alloy to lack long-range crystalline order.

Figure 12B:
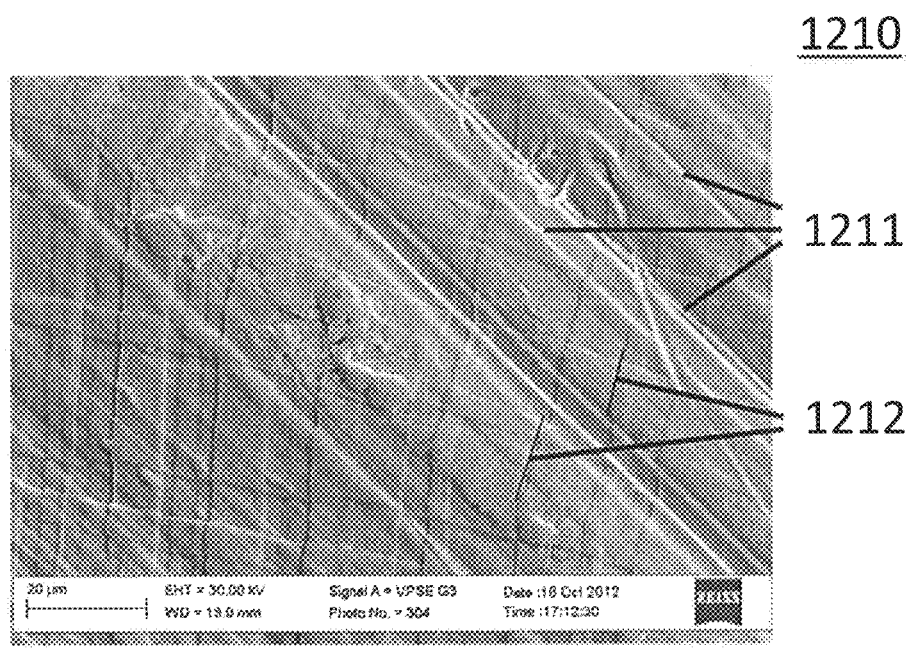

FIG. 12B is an SEM image 1210 of a lead wire of an embodiment of the present disclosure produced by co-extrusion. Image 1210 depicts shear bands 1211 at 45 degree angles with respect to the extrusion direction 1212. This phenomenon is typically observed in amorphous metals and is an indication of lack of long-range order.

Figure 13:
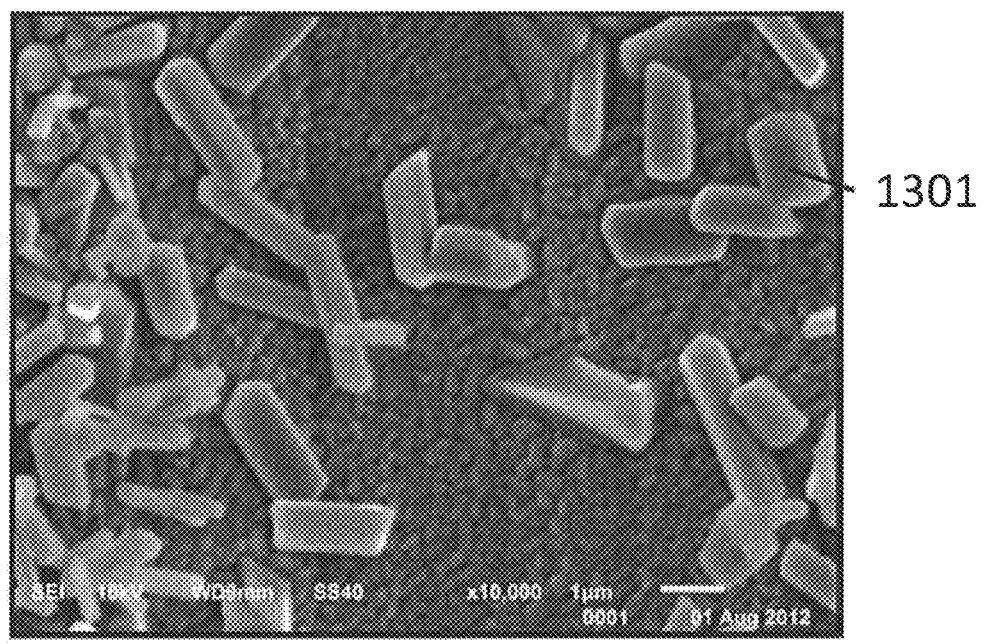
FIG. 13 is a scanning electron microscope (SEM) photograph showing the structure of nanocrystalline embodiment of alloy~1 processed with the extrusion method described above.
Figure 14:
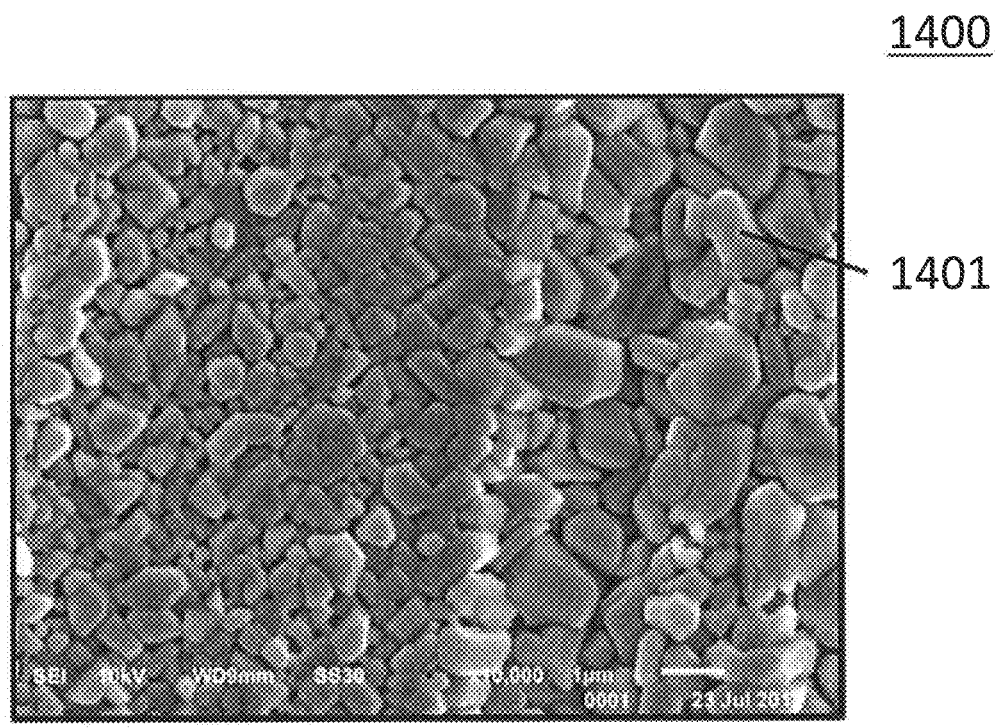
FIG. 14 is a scanning electron microscope (SEM) photograph showing the structure of nanocrystalline alloy-2 processed with the extrusion process described above.

FIG. 13 is an image 1300 of a lead wire of an embodiment of the present disclosure made from Alloy-1 by co-extrusion. FIG. 14 is an image 1400 of a lead wire of an alternative embodiment of the present disclosure made from Alloy-2 by co-extrusion. The microstructures 1301 and 1401 of the wires exhibit grain sizes of around 100 nanometers and 1 micron, respectively.

Figure 15:
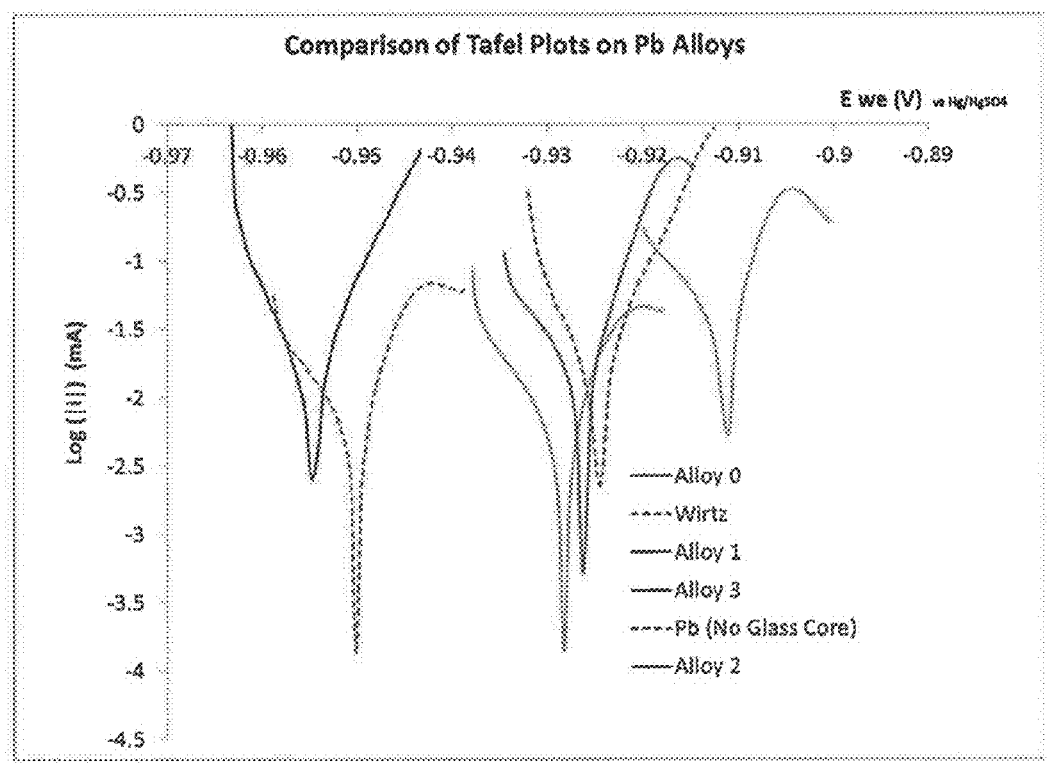
FIG. 15 is a Tafel plot of a series of wires made with lead alloys that are embodiments of the present disclosure and their measured corrosion rates.

FIG. 15 is a Tafel plot 1500 of various lead alloys according to some embodiment, indicating current density in mA as functions of electric potential in volts. The corrosion resistance can he interpreted from the Tafel plot. The corrosion resistance is a function of the equilibrium potential and equilibrium current. The equilibrium potential is the potential and the absolute minimum of the Tafel curve for each alloy. The equilibrium current is the slope of the Tafel curve for each alloy.

FIG. 16 is a table 1600 of measured corrosion rates, measured in mm per year, for the alloys depicted in FIG. 15. Table 1600 demonstrates that the alloys that have the most amount of amorphicity, or the smallest grains structures, also have the lowest corrosion rates. For example, among the alloy, Alloy-1 has one of the smallest grain sizes (as reported in FIG. 11) and the lowest corrosion rate of around 0.034 mm per year.

The foregoing description, along with its associated embodiments, is illustrative only. It is not exhaustive and does not limit the invention to the precise form disclosed. Those skilled in the art will appreciate from the foregoing description that modifications and variations are possible in light of the above teachings or may be acquired from practicing the invention. The steps described need not be performed in the same sequence discussed or with the same degree of separation. Likewise various steps may be omitted, repeated, or combined, as necessary, to achieve the same or similar objectives. Accordingly, the invention is not limited to the above-described embodiments, but instead is defined by the appended claims in light of their full scope of equivalents.

What is claimed is:

1. A composite wire for use in a current collector of an electrochemical cell, comprising:
    a glass fiber core comprising at least one glass fiber; and
    a lead alloy coating extruded onto the glass fiber core,
        wherein the lead alloy coating comprises nanocrytalline grains having an average grain size of less than or equal to about 5 nanometers, and
        wherein the nanocrystalline grains lack long-range crystalline order.

2. The composite wire of claim 1, wherein the composite wire forms a substrate of the current collector in the electrochemical cell.

3. The composite wire of claim 1, wherein the nanocrystalline grains are not generally longitudinally oriented, are variably oriented, or are randomly oriented.

4. The composite wire of claim 1, wherein the nanocrystalline grains lack uniform grain size.

5. The composite wire of claim 1, wherein the nanocrystalline grains are variably sized.

6. A conductive substrate used in an electrochemical cell, comprising:
    a plurality of composite wires forming a structure for supporting active material, each composite wire comprising:
        a glass fiber core comprising at least one glass fiber; and
        a lead alloy coating extruded onto the glass fiber core,
            wherein the lead alloy coating comprises nanocrytalline grains having an average grain size of less than or equal to about 5 nanometers, and
            wherein the nanocrystalline grains lack long-range crystalline order.

7. The conductive substrate of claim 6, wherein the conductive substrate is embedded in one or more active materials.

8. The conductive substrate of claim 7, wherein the conductive substrate includes a first portion embedded in a first active material.

9. A method for forming an electrode for an electrochemical energy storage device, comprising:
    forming a glass fiber core comprising at least one glass fiber;
    heating a lead alloy to a point below its melting point, the heated lead alloy having a flowable form;
    applying pressure to the heated lead alloy;
    extruding the lead alloy onto the glass fiber core to form a composite wire by simultaneously passing the glass fiber core and the heated lead alloy through a die;
    cooling the composite wire to form a lead alloy coating on the glass fiber core, the solid lead alloy coating comprising nanocrystalline grains having an average grain size of less than or equal to about 5 nanometers, the nanocrystalline grains lacking long-range crystalline order;
    forming a current collector using the composite wire, the current collector forming a substrate for active material; and
    disposing active material for the electrode on a portion of the grid structure of the current collector.

10. The method of claim 9, wherein the lead alloy includes one or more glass-forming elements selected from groups I-VIII of the periodic table of elements.

11. The method of claim 10, wherein an amount of the glass-forming elements is equal to or less than 1% in weight of the lead alloy.

12. The method of claim 9, wherein the cooling of the composite wire further comprising quenching the extruded lead alloy by supercooling.

13. The method of claim 12, wherein a cooling rate of the quenching is at or above 1,000,000 K/s.

\* \* \* \* \*